(12) United States Patent
Hodges et al.

(10) Patent No.: US 9,529,447 B2
(45) Date of Patent: Dec. 27, 2016

(54) REMOVABLE INPUT MODULE

(71) Applicant: Microsoft Technology Licensing, LLC, Redmond, WA (US)

(72) Inventors: Stephen E Hodges, Cambridge (GB); Stuart Taylor, Cambridge (GB); John Franciscus Marie Helmes, Steyl (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/553,491

(22) Filed: Nov. 25, 2014

(65) Prior Publication Data

US 2015/0084900 A1     Mar. 26, 2015

Related U.S. Application Data

(60) Continuation-in-part of application No. 14/513,051, filed on Oct. 13, 2014, which is a division of
(Continued)

(51) Int. Cl.
*A63F 13/00* (2014.01)
*G06F 3/02* (2006.01)
(Continued)

(52) U.S. Cl.
CPC ......... *G06F 3/0227* (2013.01); *A63F 13/2145* (2014.09); *A63F 13/22* (2014.09);
(Continued)

(58) Field of Classification Search
CPC ....... G06F 3/0219; G06F 3/023; G06F 1/1632
(Continued)

(56) References Cited

U.S. PATENT DOCUMENTS

| 4,459,578 A | 7/1984 | Sava et al. |
|---|---|---|
| 6,530,838 B2 | 3/2003 | Ha et al. |
| (Continued) | | |

FOREIGN PATENT DOCUMENTS

| CN | 201283220 | 8/2009 |
|---|---|---|
| CN | 202237223 U | 5/2012 |
| (Continued) | | |

OTHER PUBLICATIONS

"Wish List—Hardware", Published on: Apr. 6, 2011, Available at: http://wiki.openmoko.org/wiki/Wish_List_-_Hardware.
(Continued)

*Primary Examiner* — Reginald Renwick
(74) *Attorney, Agent, or Firm* — Gregg R. Wisdom; Judy Yee; Micky Minhas

(57) ABSTRACT

A removable input module for a touch-screen device is described. The input module comprises an attachment mechanism to attach the module to the touch-screen device, one or more input controls and an accelerometer and/or magnetometer. The accelerometer and/or magnetometer are configured to provide signals to be used to determine the orientation of the input module relative to the touch-screen device and/or to another input module which is attached to the same touch-screen device. In an embodiment, the input module comprises a processor arranged to analyze the output of the accelerometer and/or magnetometer and determine the orientation of the input module.

20 Claims, 14 Drawing Sheets

Related U.S. Application Data application No. 13/745,658, filed on Jan. 18, 2013, now Pat. No. 8,858,335.

(51) Int. Cl.

| | | |
|---|---|---|
| A63F 13/24 | (2014.01) | |
| A63F 13/2145 | (2014.01) | |
| G06F 1/16 | (2006.01) | |
| G06F 3/0481 | (2013.01) | |
| G06F 3/0484 | (2013.01) | |
| A63F 13/22 | (2014.01) | |
| A63F 13/92 | (2014.01) | |
| A63F 13/98 | (2014.01) | |

(52) U.S. Cl.
CPC .............. *A63F 13/24* (2014.09); *A63F 13/92* (2014.09); *A63F 13/98* (2014.09); *G06F 1/1632* (2013.01); *G06F 3/0481* (2013.01); *G06F 3/04847* (2013.01)

(58) Field of Classification Search
USPC .......................................................... 463/37
See application file for complete search history.

(56) References Cited

U.S. PATENT DOCUMENTS

| | | | |
|---|---|---|---|
| 7,580,728 B2 | 8/2009 | Vance et al. | |
| 7,653,771 B2 | 1/2010 | Liberty | |
| 7,733,637 B1* | 6/2010 | Lam ...................... | G06F 1/1626 361/679.08 |
| 7,833,097 B1 | 11/2010 | Maddox et al. | |
| 8,417,296 B2 | 4/2013 | Caballero et al. | |
| 8,529,357 B2 | 9/2013 | Joynes et al. | |
| 8,547,340 B2* | 10/2013 | Sizelove ............ | B64D 11/0015 345/173 |
| 8,634,873 B2 | 1/2014 | Jones et al. | |
| 8,858,335 B2 | 10/2014 | Helmes et al. | |
| 8,944,912 B2* | 2/2015 | Joynes .................. | G06F 3/0219 361/679.11 |
| 8,972,617 B2* | 3/2015 | Hirschman ........... | G06F 3/0219 463/37 |
| 2005/0107165 A1 | 5/2005 | Mendelson et al. | |
| 2005/0225530 A1 | 10/2005 | Evans et al. | |
| 2006/0252537 A1 | 11/2006 | Wu | |
| 2009/0033522 A1 | 2/2009 | Skillman et al. | |
| 2011/0199325 A1 | 8/2011 | Payne | |
| 2011/0230178 A1* | 9/2011 | Jones .................. | H04M 1/0235 455/422.1 |
| 2011/0260969 A1 | 10/2011 | Workman | |
| 2013/0005401 A1 | 1/2013 | Rosenhan et al. | |
| 2013/0052956 A1 | 2/2013 | Mckell | |
| 2013/0095925 A1 | 4/2013 | Xu | |
| 2013/0184077 A1 | 7/2013 | Galpern | |
| 2013/0267322 A1* | 10/2013 | South ...................... | A63F 13/06 463/38 |
| 2014/0206451 A1 | 7/2014 | Helmes et al. | |
| 2014/0247246 A1 | 9/2014 | Maus | |

FOREIGN PATENT DOCUMENTS

| | | |
|---|---|---|
| CN | 202427153 | 9/2012 |
| CN | 202860081 U | 4/2013 |
| CN | 203342350 U | 12/2013 |
| CN | 203355266 U | 12/2013 |
| CN | 103631394 A | 3/2014 |
| CN | 103721415 A | 4/2014 |
| EP | 1637984 | 3/2006 |
| EP | 1721644 | 11/2006 |
| EP | 2311539 | 4/2011 |
| JP | 2009087081 | 4/2009 |
| WO | WO2007048043 | 4/2007 |

OTHER PUBLICATIONS

Cummings, Corey, "Drone Controller Turns Your Smartphone into a Console", Published on: Mar. 31, 2012, Available at: http://techli.com/2012/03/drone-controller/.

"Sixaxis Controller App—Use your PS3 Controller to Play Android Games", Aug. 9, 2012, Available at: http://www.techgadgetsnews.com/sixaxis-controller-app-use-your-ps3-controller-to-play-android-games/.

Newman, Jared, "Smartphones and Tablets Get their Gaming Buttons", Published on: Jan. 8, 2012, Available at: http://www.technologizer.com/2012/01/08/smartphones-and-tablets-get-their-gaming-buttons/.

Glenn, "Nvidia and Nyko Will Offer PlayPad Controllers to Tegra-Based Devices", Published on: Jun. 7, 2012, Available at: http://thedroidguy.com/2012/06/nvidia-and-nyko-will-offer-playpad-controllers-to-tegra-based-devices/.

Moore, Nick, "The Powera MOGA Brings Console-Like Game Controls to Android Phones", Published on: Jun. 3, 2012, Available at: http://www.gizmag.com/powera-moga/22794/.

Fingas, John, "FlipSide case for iPhone packs stealthy game controls, plays on solar power", Published on: Dec. 23, 2012, Available at: http://www.engadget.com/2012/12/23/flipside-case-for-iphone-packs-stealthy-game-controls/.

Perry, Douglas, "PowerA's MoGa Turns Phones Into PS Vita and DS Rivals", Published on: Jun. 26, 2012, Available at: http://www.tomsguide.com/us/powera-moga-controller-android-gaming,news-15509.html.

Hatfield, Don, "Gametel Game Controller Now Supports iPhone and iPad", Published on: Jun. 1, 2012, Available at: http://multiplayerblog.mtv.com/2012/01/06/gametel-game-controller-now-supports-iphone-and-ipad/.

Evans, Joe, "Mad Catz MIDI PRO-Adapter", Published on: Jan. 12, 2011, Available at: http://www.legitreviews.com/article/1523/1/.

Lee, Cody, "Introducing Bladepad, the detachable iPhone gamepad", Published on: Aug. 6, 2012, Available at: http://www.idownloadblog.com/2012/08/06/detachable-iphone-gamepad/.

www.pcgerms.com, "GameKlip: Fusion of Android smartphones and PS3", Published on: Aug. 7, 2012, Available at: http://www.pcgerms.com/gameklip-fusion-of-android-smartphones-and-ps3-controllers/.

www.myandroidgadgets.com, "Play your Android games in style; Check out this homemade PS3 controller Samsung Galaxy Nexus dock", Published on: Aug. 24, 2012, Available at: http://myandroidgadgets.com/play-your-android-games-in-style-check-out-this-homemade-ps3-controller-samsung-galaxy-nexus-dock/.

Kuchera, Ben, "Mad Catz releases the MLG console controller: for $100 you can have it your way", Published on: Jan. 11, 2012, Available at: http://arstechnica.com/gaming/2012/01/mad-catz-offers-the-mlg-console-controller-for-100-you-can-have-it-your-way/.

TechnicalMarkus, "Ice Cream Sandwich lets you use game controllers on your Android phone", Published on: Oct. 25, 2011, Available at: http://www.mobileshop.com/blog/mobile-phone-blogs/ice-cream-sandwich-lets-you-use-game-controllers-on-your-android-phone/.

Alibaba.com, "Mobile Gaming controller", Published on: date unknown (not later than Aug. 2012), Available at: http://www.alibaba.com/product-gs/453473204/Mobile_Gaming_controller.html.

Willington, Ray, "Wikipad Gaming Tablet Coming With Android 4.0, Controller Add-On", Published on: May 4, 2012, Available at: http://hothardware.com/News/Wikipad-Gaming-Tablet-Coming-With-Android-40-Controller-AddOn/.

blu-max.com, "Bluetooth Stereo Headset—Blumax Clip", Published on: Apr. 12, 2012, Available at: http://blu-max.com/products/bluetooth_headset_clip.html.

"Gametel", Sep. 17, 2014 Available at: http://www.gametel.se/.

Gorman, Michael, "Gametel Bluetooth Mobile Controller", Published on: Aug. 30, 2012 Available at: http://www.gametel.se/.

"MOGA Ace Power", Sep. 17, 2014 Available at: http://www.mogaanywhere.com/ace/.

(56) References Cited

OTHER PUBLICATIONS

"MOGA Pocket Controller", Sep. 17, 2014 Available at: http://store.mogaanywhere.com/Products/CPFA000253-01.
"NVidia Shield", Sep. 17, 2014 Available at: http://shield.nvidia.com/.
"Razer Junglecat—Mobile Game Controller for the iPhone", Sep. 17, 2014 Available at: http://www.razerzone.com/gaming-controllers/razer-junglecat.
"Steelseries Stratus Wireless Gaming Controller", Sep. 17, 2014 Available at: http://steelseries.com/us/products/controllers/steelseries-stratus-wireless-gaming-controller.
"SMACON", Sep. 17, 2014 Available at: http://www.sma-con.com/en/.
"Ion iCade", Sep. 17, 2014 Available at: http://www.ionaudio.com/products/details/icade.
"Samsung Smartphone GamePad", Sep. 17, 2014 Available at: http://www.samsung.com/uk/consumer/mobile-devices/smartphones/smartphone-accessories/EI-GP20HNBEGWW.
"Range of iPega Controllers", Sep. 17, 2014 Available at: http://www.amazon.co.uk/s/?ie=UTF8&keywords=ipega+controller&tag=mh0a9-21&index=aps&hvadid=3170930385&ref=pd_sl_8cqpt3usal_ee.
"Bluetooth Game Controller, The Drone!", Sep. 17, 2014 Available at: http://www.roms4droid.com/index.php/bluetooth-game-controller-the-drone/.
"GameVice", Sep. 17, 2014 Available at: http://www.gamevice.com/.
"Phonejoy", Sep. 17, 2014 Available at: http://phonejoy.com/.
Lefebvre, Rob, "First Two iOS 7 Game Controllers Teased by Logitech, ClamCase", Published on: Sep. 19, 2013 Available at: http://www.cultofmac.com/246399/first-two-ios-7-game-controllers-teased-by-logitech-clamcase/.
Tyson, Mark, "GameKlip Clips a PS3 Controller to your Android Phone", Published on: Aug. 7, 2012 Available at: http://hexus.net/gaming/news/android/43409-gameklip-clips-ps3-controller-android-phone/.
Davidson, Andrew, "XOPAD Open Source Android USB Controller gets into the Game", Published on: Feb. 5, 2013 Available at: http://www.gizmag.com/xopad-open-source-usb-game-controller-android/26095/.
Ayeleasebee, "iFrogz to unveil $70 Caliber Advantage mobile gaming controller; Belkin to display new $80 and $50 iPad keyboard cases", Published on: Jan. 8, 2013 Available at: http://9to5mac.com/2013/01/08/ifrogz-to-unveil-70-caliber-advantage-mobile-gaming-controller-belkin-to-display-new-80-and-50-ipad-keyboard-cases/.
Reid, Ben, "This Gaming Controller for the iPad mini, Nexus 7 Looks Stunning [Video]", Published on: Apr. 12, 2013 Available at: http://www.redmondpie.com/game-d-controller-for-ipad-mini-and-nexus-7-video/.
"Pocket Gamer: Video Game Controller for iPhone", Sep. 9, 2014 Available at: https://www.kickstarter.com/projects/1685918106/pocket-gamer.
Thukral, Hitesh, "WikiPad first glasses-free 3D Android tablet with attachable game controller", Sep. 9, 2014 Available at: http://techwrldinfo.blogspot.in/2012/01/wikipad-first-glasses-free-3d-android.html.
"Dualshock® 3 Wireless Controller", Published on: Nov. 22, 2010 Available at: http://us.playstation.com/ps3/accessories/dualshock-3-wireless-controller-ps3.html.
"Psyclone TouchCharge Kit Review: Wireless Charging Comes to Game Controllers", Published on: Oct. 1, 2009 Available at: http://www.popularmechanics.com/technology/gadgets/4294717.
"Gamepad", Published on: Sep. 17, 2012 Available at: https://www.scirra.com/manual/143/gamepad.
"PG-9023 wireless bluetooth game controller for mobile phone tablet PC", Sep. 13, 2014 Available at: http://www.alibaba.com/product-detail/PG-9023-wireless-bluetooth-game-controller_2006404292.html.
"PlayStation 3 Wireless Sixaxis Controller", Published on: Nov. 17, 2006 Available at: http://www.amazon.com/PlayStation-3-Wireless-Sixaxis-Controller/dp/B000K1CS5Y.
Lee, Cody, "Wikipad introduces new 'Gamevice' controller for iPad mini", Published on: Jun. 18, 2014 Available at: http://www.idownloadblog.com/2014/06/18/wikipad-gamevice-ipad-mini/.
Yu, et al., "Clip-on Gadgets: Expanding Multi-touch Interaction Area with Unpowered Tactile Controls", In Proceedings of the 24th annual ACM symposium on User interface software and technology, Oct. 16, 2011, 5 pages.
"Charging without Wires", Published on: May 13, 2012 Available at: http://batteryuniversity.com/learn/article/charging_without_wires.
Hwang, et al., "MagGetz: Customizable Passive Tangible Controllers on and Around Conventional Mobile Devices", UIST'13, Oct. 8-11, 2013.
Liang, et al., "GaussBricks: Magnetic Building Blocks for Constructive Tangible Interactions on Portable Displays", CHI 2014, Apr. 26-May 1, 2014.
Response filed for application No. EP14708124.4 dated Mar. 23, 2016, 15 pages.
International Search Report & Written Opinion for PCT Patent Application No. PCTUS2014011368, Mailed Nov. 6, 2014, 21 pages.

* cited by examiner

REMOVABLE INPUT MODULE

RELATED APPLICATIONS

This application is a continuation-in-part of and claims priority to application Ser. No. 14/513,051, filed on Oct. 13, 2014, and entitled "RECONFIGURABLE CLIP-ON MODULES FOR MOBILE COMPUTING DEVCES" which is a divisional application of application Ser. No. 13/745,658, filed on Jan. 18, 2013, and entitled "RECONFIGURABLE CLIP-ON MODULES FOR MOBILE COMPUTING DEVCES." This application claims the benefit of both the above-identified applications, and the disclosure of the above-identified applications is hereby incorporated by reference in its entirety as if set forth herein in full.

BACKGROUND

There are large numbers of computing devices that have touch-sensitive screens which allow users to interact using touch gestures directly on the device's screen. Examples include smartphones, tablet computers, large interactive surface computers and touch-sensitive displays for desktop computers. In some applications, this interface provides an adequate user input mechanism.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A removable input module for a touch-screen device is described. The input module comprises an attachment mechanism to attach the module to the touch-screen device, one or more input controls and an accelerometer and/or magnetometer. The accelerometer and/or magnetometer are configured to provide signals to be used to determine the orientation of the input module relative to the touch-screen device and/or to another input module which is attached to the same touch-screen device. In an embodiment, the input module comprises a processor arranged to analyze the output of the accelerometer and/or magnetometer and determine the orientation of the input module.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

There are many computing devices which comprise a flat, continuous interaction surface (the device screen), including smartphones, tablets (which may also be referred to as slates), surface computing devices and touch-sensitive displays for desktop computers. The lack of physical reference points or tactile feedback provided by the touch-sensitive screen (unlike with physical buttons) can cause problems for some applications (e.g. games) and for some users (e.g. those with a visual impairment). The flat, continuous interaction surface (the device screen) can be difficult to use as there are no physical boundaries or tactile feedback to help guide and keep the user's fingers in the correct place. It is easy for a user's fingers to move when playing a game so that the fingers are no longer aligned with the game's input controls and this is exacerbated where the game requires rapid or frequent input. Additionally, when in position, the user's fingers may obscure areas of the screen and this may impact usability, particularly for smaller form factor devices (e.g. smartphones).

The embodiments described below are not limited to implementations which solve any or all of the disadvantages of known user input devices.

Figure 1:
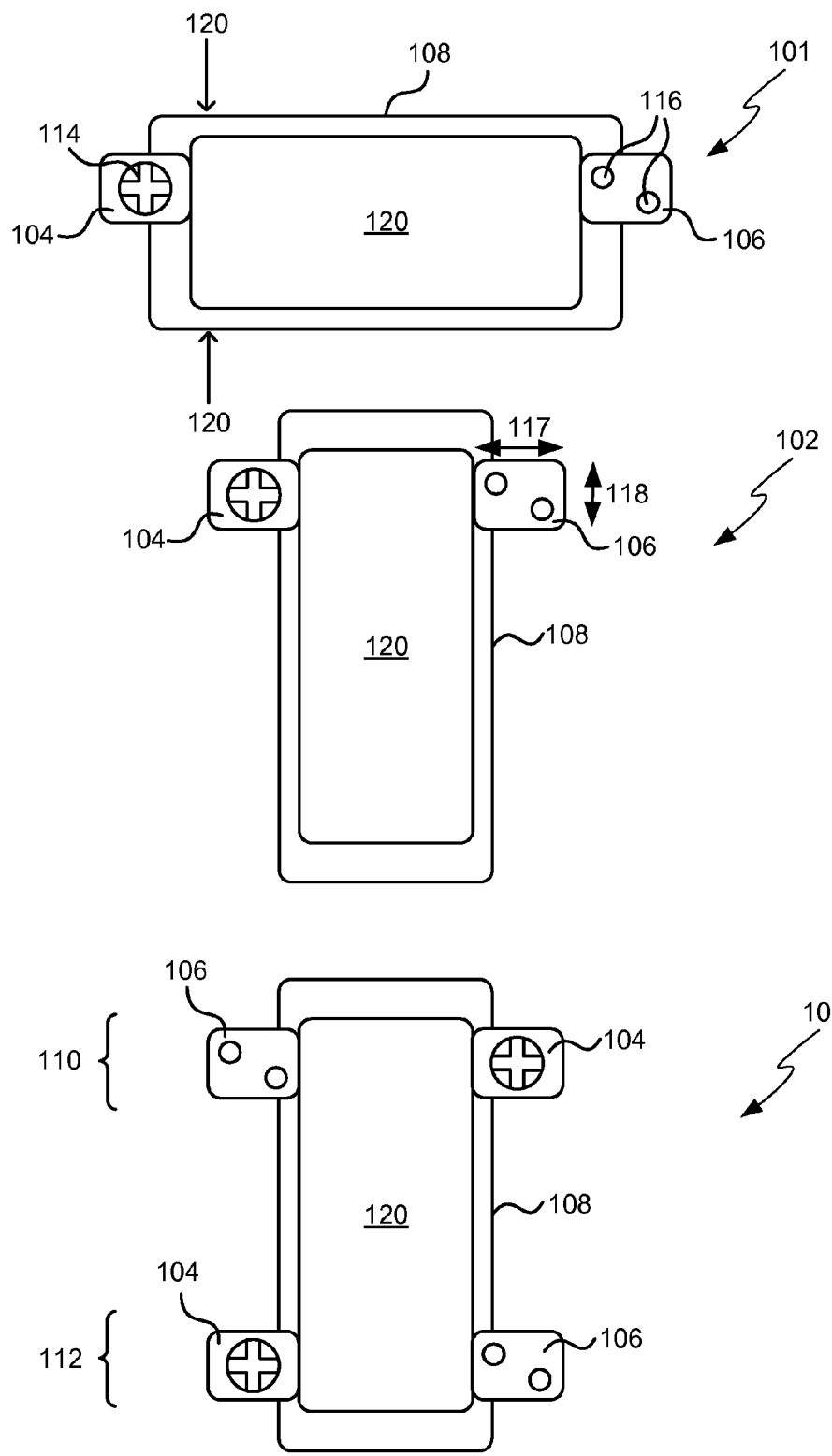
FIG. 1 shows three schematic diagrams of sets of reconfigurable input/output modules attached around the periphery of a touch-screen device.

FIG. 1 shows three schematic diagrams 101-103 in which reconfigurable input/output modules 104, 106 are attached around the periphery of a touch-screen device 108 (i.e. around the edge of the display), which may, for example, be a portable or handheld device such as a tablet (of any size) or smartphone or a fixed touch-screen device (e.g. on an appliance or in a vehicle). In the first diagram 101, the touch-screen device 108 is oriented in landscape and one input/output module 104, 106 is attached on each of the short sides of the device (i.e. on the short sides of the face of the device which includes the display). In the second diagram 102, the touch-screen device 108 is in portrait orientation and the input/output modules 104, 106 are attached on the long sides of the device. In the third diagram 103, there are four input/output modules 104, 106 which are arranged at each end of the touch-screen device 108 and which may provide a pair of input/output modules 110 for use by a first user and a pair of input/output modules 112 for use by a second user, for example when playing a two player game on the touch-screen device 108. Alternatively, the four input/output modules in the third diagram 103 may be used by a single user.

As shown by the three examples in FIG. 1, the input/output modules 104, 106 can be placed anywhere around the periphery of the touch-screen device 108 and may be rearranged by a user depending on the application displayed/running on the device, personal preference, or any other factor. Consequently, the modules may be described as reconfigurable (e.g. a user can choose where to place the modules and can move them if they wish). It will be appreciated that in some examples there may be positions where a module cannot be placed (e.g. over a camera or power button, although in many instances a module may be placed over either or both of these), but a user still has the ability to position the modules freely on the remaining periphery of the touch-screen device. Furthermore, although the examples in FIG. 1 show use of two and four modules, in other examples, a set of modules may comprise N modules, where N is an integer and N≥2.

At least one of the input/output modules 104, 106 comprises an input control and in the examples shown, all the input/modules comprise an input control (e.g. four-way control 114 or buttons 116). In various examples, the input control is a tactile input control, such as a physical control (e.g. one with a contoured profile which may move when pressure is applied by a user) which provides tactile feedback to a user that their finger/thumb is correctly positioned on the control. In other examples, the input control may not be tactile and instead may comprise an optical sensor, capacitive sensor or other sensor. In further examples, a combination of tactile and non-tactile input controls may be provided. It will be appreciated that the examples shown in FIG. 1 (a four-way control and a pair of buttons) are just examples of the input controls that may be provided on an input/output module. Further examples include, but are not limited to, a rotary knob, a slider, a single button (or different number of buttons), a switch and a small joystick. Examples of sensors which may be used include, but are not limited to, a hover sensor for hand position (e.g. based on reflecting IR or seeing IR shadows or thermal IR sensing or based on ultrasound), a magnetometer for sensing distortions due to rings worn on hands, or any other type of sensor that can detect a characteristic of the human or of something the human is wearing. If the device (e.g. the touch-screen device or the module) is flexible or articulatable, then the sensors may detect how the user flexes or articulates the device, e.g. using accelerometer.

Each input control 114, 116 is mapped to a user input of an application or other program (e.g. the operating system or any other software) displayed/running on the touch-screen device 108. The user inputs to which an input control 114, 116 is mapped may be a touch-event (i.e. a user input that a user would usually provide by touching the touch-sensitive display) or may be an input via a physical button or control on the touch-screen device 108 or any input via a supported peripheral (e.g. a Bluetooth keyboard) or any other supported hardware (where the hardware need not be present but only be supported by the program receiving the user input). In some examples, the user inputs may be keystrokes such that the input/output modules may be used instead of an onscreen keyboard.

Where there are multiple input controls, as in the examples shown in FIG. 1, each input control may be mapped to a different user input of the same application/program or the input controls may be mapped to user inputs of two or more applications/programs. In an example, both the four-way control 114 and buttons 116 may be mapped to user inputs of a game which is displayed or running on the touch-screen device. In another example, the four-way control 114 may be mapped to a user input of a game running on the touch-screen device 108 (or a cloud-based game which is displayed on the touch-screen device) and the buttons 116 may be mapped to functions within the operating system (OS) of the device, such as volume controls. In a further example, the four-way control 114 may be mapped to a user input of an application displayed/running on the touch-screen device 108 and one of the buttons may be mapped to a particular input in another application (e.g. an 'answer' button in an IP telephony application). The mapping may be fixed, dynamic or a combination of both fixed and dynamic (e.g. with a first subset of controls having a fixed mapping and a second subset of controls being dynamically mapped, where each subset does not comprise all of the controls). There may be a number of factors which influence the mapping and these may include the position of an input/output module, the relative position of more than one input/output module, the particular application (or other program) which is visible on the screen (or uppermost, where multiple applications are visible), user input, etc. The mapping of controls to inputs is described in more detail below.

In the examples shown in FIG. 1, the input control is on the front face of a module (i.e. on the face which is substantially parallel to the touch-screen display in use or when the module is attached to the device). Alternatively, an input control may be provided on another face of the module or a corner of the module in addition to, or instead of, an input control on the front face (e.g. to provide finger trigger buttons on a top side of a module and/or tactile controls on a rear surface of the display). For example, an input control may be provided on both the front and rear faces.

In various examples, one or more of the modules may comprise an output device such as a visual indicator (e.g. a small display or one or more LEDs), audible indicator (e.g. a small speaker or buzzer or headphone socket), tactile (or haptic) feedback device (e.g. a vibration mechanism, any physical movement actuator or a movement retarder if the touch-screen device or module is flexible or articulatable) or other sensory feedback device (e.g. a heating/cooling device, such as a Peltier cooler, which can provide feedback by changing the temperature of a module or chemical outputs for smells, hormones, etc). In various examples, a module may comprise both an input device (e.g. a tactile control) and an output device (e.g. an indicator LED).

When positioned around the periphery of a touch-screen device 108 (and physically attached to the touch-screen device), the input/output modules 104, 106 obscure little or none of the actual display area 120 and in the examples shown in FIG. 1, the modules 104, 106 do not obscure any of the actual display area 120. This means that there is more real estate on the screen for viewing and increases ease of use. Although the modules are described herein as being attached around the periphery of the device, in other examples the modules may be attached in other places, i.e. to other non-display portions of the touch-screen device, such as the rear face of the device.

Figure 9:
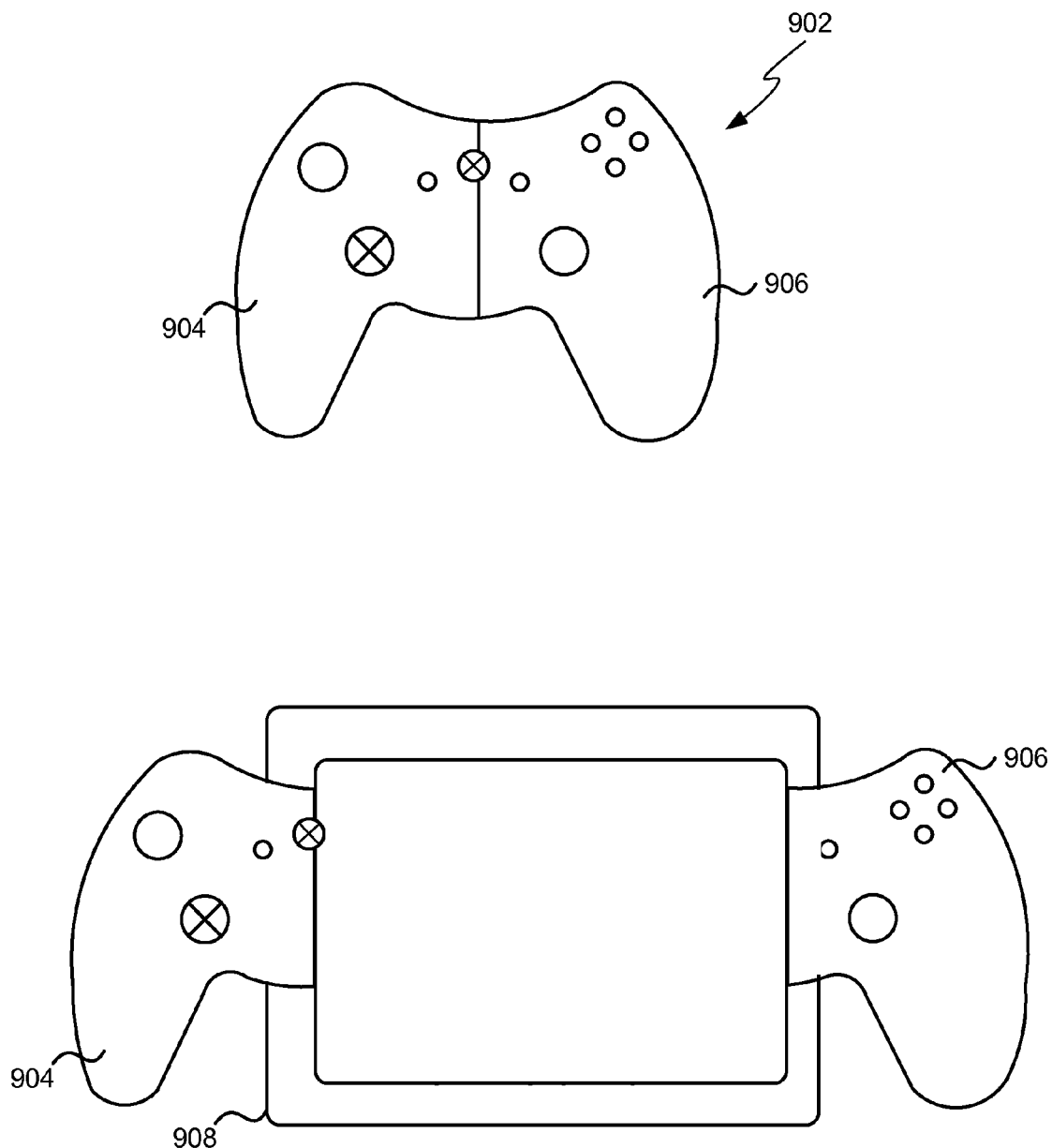
FIG. 9 shows a schematic diagram of a games controller which comprises two halves each of which is operable as an input/output module.

It will be appreciated that FIG. 1 is not necessarily drawn to scale, however, in various examples the modules are compact and have dimensions (e.g. the length of a side of the front face, as indicated by arrows 117, 118) which are considerably smaller than the touch-screen device 108 to which they attach. For example, the front face of the modules may be approximately 1 inch (2.54 cm) square and used with touch-screen displays ranging from around 3 inches (~7.5 cm) to 10 inches (~25 cm) or more (where the screen size is measured on the diagonal). In other examples, however, the modules may not be considerably smaller than the touch-screen device to which they attach (e.g. as shown in FIG. 9 and described below). Although FIG. 1 shows all the modules being approximately the same shape and size, in some examples, the modules within a set may be of different sizes and/or shapes.

Figure 2:
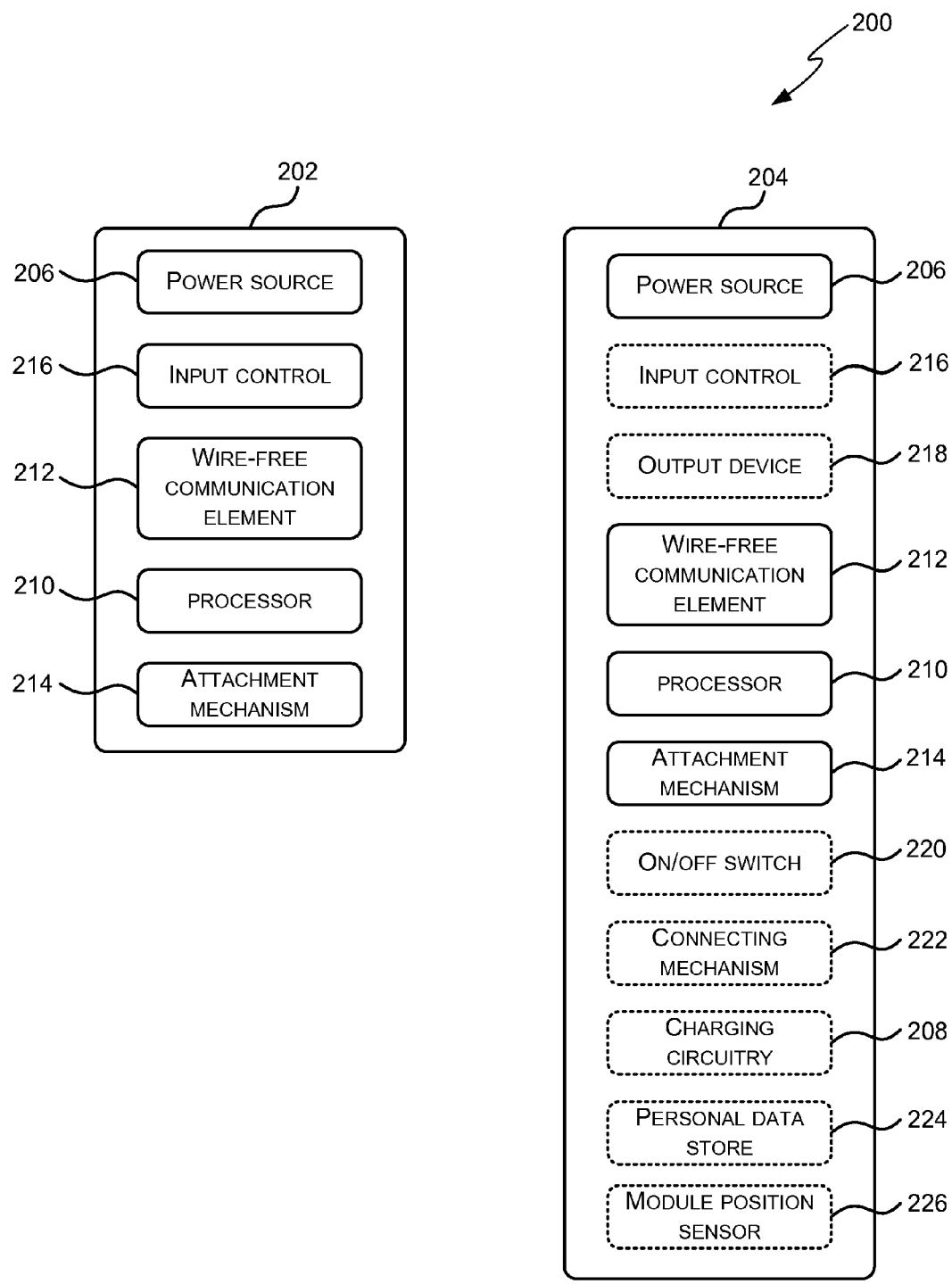
FIG. 2 shows a schematic diagram of an example set of input/output modules, such as those shown in FIG. 1.

FIG. 2 shows a schematic diagram of an example set of input/output modules 200, such as those shown in FIG. 1. The set of input/output modules 200 shown in FIG. 2 comprises two modules 202, 204 although other example sets may comprise more than two modules. Each module comprises a power source 206, which may, for example, be a battery or super capacitor. Super capacitors have an extremely short charge time compared to batteries (e.g. a 10 second charge may be sufficient to power the module for about an hour of normal use) which makes them particularly suited to this application. Where super capacitors or rechargeable batteries are used, the module may further comprise charging circuitry 208. The charging circuitry may take power from a mains electricity supply or may draw power from the touch-screen device (e.g. via a USB or proprietary connector on the device or using a wireless charging mechanism).

Each module 202, 204 also comprises a processor 210 (such as a microcontroller, microprocessor or any other suitable type of processor for processing computer executable instructions) which controls the operation of the module, a wire-free communication element 212 and a physical attachment mechanism 214 which is used to attach the module to a touch-screen device (e.g. at different positions around the periphery of the device). Many different attachment technologies may be used and various examples are described below with reference to FIG. 3. Although the module is shown comprising a processor 210, it will be appreciated that in some examples, for example where a system on a chip architecture is used, the processor 210 may include one or more fixed function blocks (also referred to as accelerators) which implement a part of the method of operation of the module in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions (which are executed by the processor 210) may be provided using any computer-readable media that is accessible by the module. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. The computer storage media (e.g. memory) may be within the module or the storage may be distributed or located remotely and accessed via a network or other communication link.

The wire-free communication element 212 is arranged to communicate with the touch-screen device and/or with other modules within the set 200. In particular, signals that represent the user inputs received at the module (via an input control 216) are communicated to the touch-screen device via the wire-free communication element 212. Where the module comprises an output device 218, signals may also be communicated from the touch-screen device to the module via the wire-free communication element 212 and used to control an output device 218.

At least one of the modules in the set 200 comprises a wire-free communication element 212 that is arranged to communicate with the touch-screen device and where a module comprises a wire-free communication element 212 that is not arranged to communicate with the touch-screen device, the element 212 may be arranged to communicate with another module in the set which may act as a gateway/relay for communications with the touch-screen device. In various examples, all of the modules in the set 200 may communicate directly with the touch-screen device rather than passing messages via one of the modules that acts as a gateway to the touch-screen device for all the modules in the set. Alternatively, one of the modules in the set 200 may act as a relay for the other modules in the set such that only the relay has a wire-free communication element 212 arranged to communicate with the touch-screen device and the remaining modules in the set comprise a wire-free communication element 212 that is arranged to communicate with the module that acts as a relay. In this way the non-relay modules act as slaves to the master module which acts as relay and communicates with the touch-screen device and this reduces overall power consumption.

Any suitable wire-free communication protocol or mechanism may be used and examples include:

- audio (e.g. 900 Hz tones of different lengths, AFSK or DTMF),
- Bluetooth® (e.g. BLE or Bluetooth® Smart),
- NFC,
- other low energy radio protocols (e.g. ZigBee, ANT or Peanut),
- magnetic field based techniques,
- capacitive signaling using the touch-screen sensor
- optical or infra-red techniques (e.g. using an LED on the module to communicate with a camera or proximity sensor on the touch-screen device), and
- vibration based techniques (e.g. which communicate with an accelerometer in the touch-screen device).

The term 'wire-free' is used herein to refer to any technology which does not rely on a direct electrical connection along electrical conductors (i.e. wires) between the module and the touch-screen device. The term 'wire-free' therefore encompasses all wireless (e.g. RF) technologies in addition to other technologies which do not rely on wires, such as other wave-based technologies (e.g. optical technologies, sound and use of vibrations).

In an example, each module may communicate directly with the touch-screen device using low energy Bluetooth® (e.g. BLE or Bluetooth® Smart) as most touch-screen devices have integrated Bluetooth® capabilities. Alternatively, where a proprietary or less common protocol is used by the wire-free communication element 212 and the touch-screen device is not equipped to receive such a protocol, a module may communicate (using the wire-free communication element 212) with the touch-screen device via a communications module which may be connected to the touch-screen device using a wired connector (e.g. a mini or micro USB connector or proprietary connector). This communications module receives the unfamiliar protocol and converts the signals into a protocol that is recognized by the touch-screen device.

In another example, the wire-free communication element 212 may use sound to communicate with the touch-screen device. In an example implementation, the wire-free communication element 212 may comprise a small loudspeaker or buzzer which emits short audible beeps (e.g. at 900 Hz) when a user presses an input control on the module or alternatively a tone may be generated mechanically. Within a set of modules, different input controls (or different movement of the same input control) may cause beeps of different durations. These beeps can be captured and decoded by the touch-screen device (e.g. via the touch-screen device's microphone) and then input into an application or the OS running on the device to simulate the user's tapping of onscreen controls. Alternatively, different frequency tones may be used (e.g. as in DTMF signaling or AFSK).

In some examples, the set of input/output modules may further comprise an input/output module which does not comprise a wire-free communication module but is instead connected to another input/output module via a wired connection.

As described above, at least one of the input/output modules in the set 200 comprises an input control 216. As described above, this input control 216 may be tactile (e.g. a raised button or other control) and may provide tactile feedback to the user when pressure is applied (e.g. the control may tilt or otherwise move). Alternatively, the input control 216 may be a capacitive, optical or other sensor and not provide any tactile feedback. In some examples, an input/output module may be arranged such that the input control 216 is removable such that a module can be reconfigured by removing one input control (e.g. a four-way switch) and replacing it with a different input control (e.g. a single button).

Optionally the input control 216 may comprise Natural User Interface (NUI) technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

A module may also comprise one or more additional elements, for example an output device 218 (as described above), an on/off switch 220, a connecting mechanism 222 and/or a personal data store 224. The connecting mechanism 222 may be arranged to physically connect the modules in a set together (e.g. for ease of storage and/or to reduce the risk of a module getting lost) and may, in some examples, also provide an electrical connection between modules such that the power sources 206 with the modules can be charged whilst they are connected together and requiring attachment of a single charging lead. In some examples, the attachment mechanism 214 may be arranged to also act as a connecting mechanism 222.

The personal data store 224 may, for example, be used to store login details or credentials associated with an application or other program (e.g. a user's gaming login details) and/or other personal details associated with an application or other program (e.g. a user's skill level, highest score or profile) and/or configuration preferences for the input/output modules. In other examples, the personal data store 224 may be used to store authentication or security information (e.g. a user's private key or credentials). Data from the personal data store 224 may be communicated to the touch-screen device via the wire-free communication element 212 and may, for example, be used in configuring the input/output modules (e.g. when mapping inputs to touch events) and/or in configuring an application running on the touch-screen device. In an example, if a user stores their gaming login details on their modules (in the personal data store 224), they may be automatically logged into a game when they attach the input/output modules to a touch-screen device on which the game is installed. They may also remain authenticated with the game until the modules are detached from the touch-screen device. In another example, login details stored in the personal data store 224 may be used to access user preferences from a remote (e.g. cloud-based) store instead of storing user preferences in the personal data store.

Figure 3:
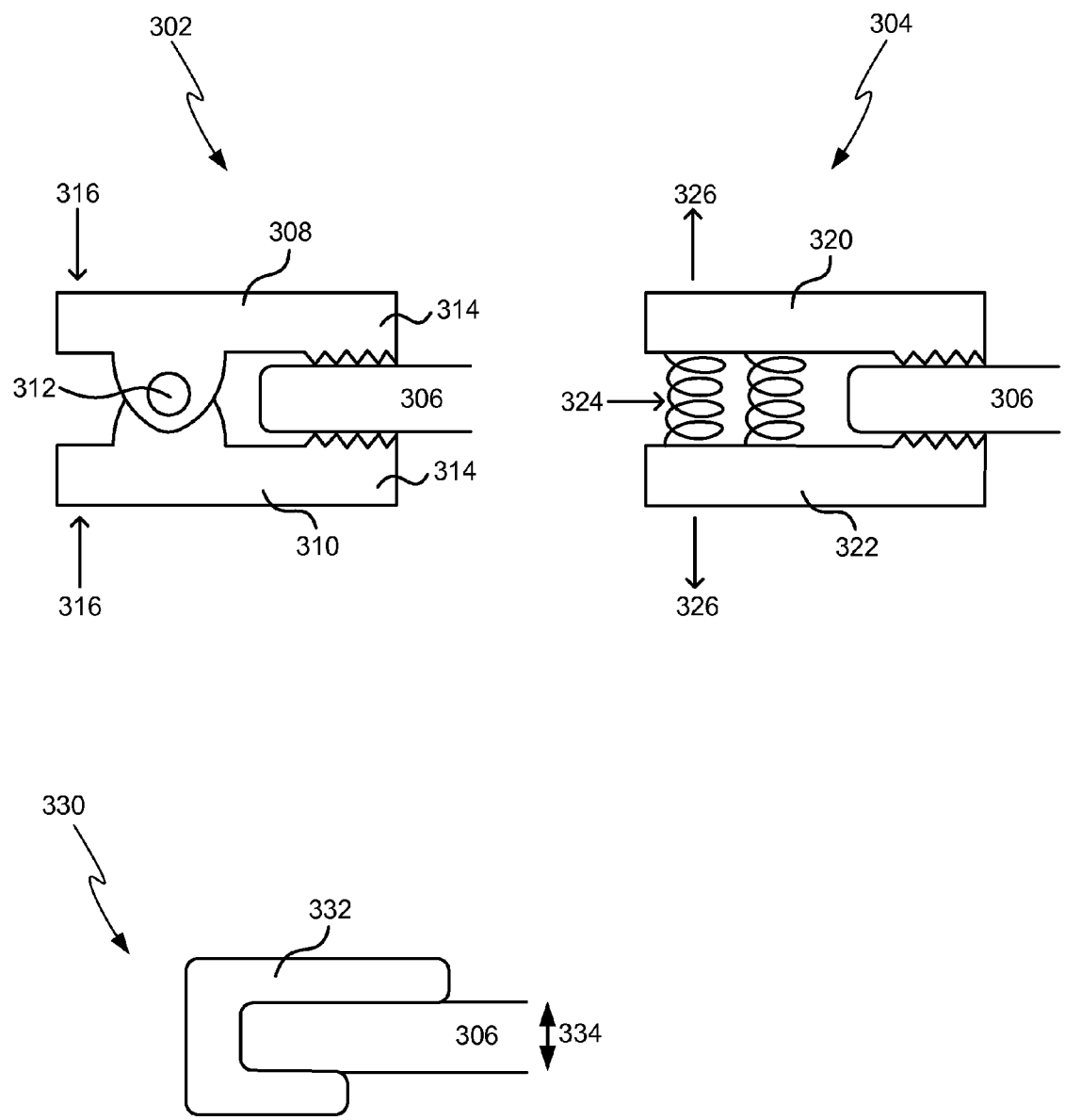
FIG. 3 shows schematic diagrams of various different attachment mechanisms.

FIG. 3 shows schematic diagrams of various different attachment mechanisms which may be used to enable the modules to be physically attached anywhere around the periphery of a touch-screen device. All the examples shown in FIG. 3 use a clamp mechanism (or arrangement) as the attachment mechanism grips the edge of the touch-screen device in some way (e.g. by contacting two opposing parallel faces of the device). When gripping the touch-screen device, the inner faces of the modules that are in contact with the touch-screen device may be shaped (or structured) to prevent the module from slipping off the device (e.g. in a complementary manner to any structure on the touch-screen device itself) and/or non-slip surfaces may be provided on the inner faces. As described above, any suitable mechanism may be used including, but not limited to, clamp mechanisms, sprung mechanisms (i.e. mechanisms which involve some form of spring or deformation of material), magnets, friction-fit (or push-fit) mechanisms and mechanisms using suction or adhesion (whether temporary or permanent), where any module may use one or more of these mechanisms. Depending on the mechanism used, a module may fix to the touch-screen device by contacting at least two faces of the touch-screen device (as in FIG. 3) or by fixation to a single face (e.g. fixation solely on the back of the touch-screen device).

The first two examples 302, 304 in FIG. 3 show sprung mechanisms such that the front and back portions of the module clamp onto the touch-screen device 306. This means that the module is unlikely to slip or move once positioned by a user and also the module can accommodate different thicknesses of touch-screen device (e.g. both a smartphone and a tablet).

In the first example 302, the front portion 308 and back portion 310 of the module are connected by a pivot joint 312 and the mechanism is sprung, like a bull-dog clip or clothes peg, such that in the absence of a device 306 the jaws of the module 314 are forced together (i.e. the natural position of the module is with the jaws closed). By applying a pinching force on the other side of the joint 312 from the jaws (e.g. in the positions indicated by arrows 316) a user can force the jaws apart so that the module can be clipped onto the touch-screen device 306.

In the second example 304, the module comprises a front plate 320 and a back plate 322 which are connected by springs 324 which pull the plates together. In order to clip the module onto a touch-screen device 306 (or other object), a user pulls the plates apart (e.g. as indicated by arrows 326) and fits the module around the edge of the touch-screen device 306 before releasing the plates. Whilst this example may be more compact than the first example, particularly when the modules are not clipped to a touch-screen device (as the natural position of the module is with the two plates in contact with each other), the pivot mechanism of the first example makes it easier to attach the module to the touch-screen device.

In the third example 330, the module 332 is formed such that it is a push-fit around the touch-screen device 306. This means that the module 332 is designed for a particular thickness of touch-screen device (where the thickness is indicated by arrow 334) and different module designs may be produced to fit different thicknesses of touch-screen device. Alternatively, magnets may be included within the module 332 so that the module attaches to the touch-screen device 306 even in situations where the module does not correspond exactly to the thickness of the touch-screen device (i.e. so that the module does not need to be a push-fit).

Although the examples shown in FIG. 3 clamp to the front and back faces of the touch-screen device, in other examples, the modules may clamp (or otherwise attach) to the top and bottom of the touch-screen device (e.g. at positions marked 120 in the first diagram 101 in FIG. 1).

In some examples, the attachment mechanism 214 may be interchangeable so that for example in the third example 330 of FIG. 3, a module can be adapted to attach to different form factor devices without having to replace the entire module (e.g. without replacing the electronics within the module).

As described above, a module may comprise an on/off switch 220. Alternatively, a module may comprise a sensor which is arranged to detect whether the module is attached to a touch-screen device (or to anything else) or not and which is further arranged to switch the module on automatically when it is attached to something (or only when it is attached to the touch-screen device). Where such a sensor is used, this sensor may be integrated within the attachment mechanism 214 (e.g. within the spring clip arrangement of the first example 302 of FIG. 3) or may be provided separately (e.g. an optical sensor on the face which is in contact with the front face of the touch-screen device and which detects whether the touch-screen is switched on). In addition, or instead, this sensor may be used for other purposes, for example, the sensor may be used to trigger an action (e.g. sending an identifier or calibration signal to the touch-screen device) when the module is attached to a touch-screen device. In some examples, a module may comprise both a sensor and an on/off switch.

As described above, the input controls on the modules are mapped to a user input of an application, the OS or other program displayed/running on the touch-screen device. This mapping may be static (e.g. set up initially and then remains the same) or dynamic (e.g. it may depend on which application is active on the touch-screen device or may change during operation of the application). In an example, the mapping of the input controls to user inputs may change dependent upon which program a user is interacting with on the touch-screen device at any time, such that where a user switches between applications (e.g. between a game and a calendar application) the mapping changes. In another example, the mapping may change dependent upon the location (or relative location) of the modules when attached to the touch-screen device. In other examples, a combination of any of the methods described herein may be used.

In examples where the mapping is dependent upon the position or relative position of the input/output modules, the position or relative position of modules may be detected by the touch-screen device or by the modules themselves. In a first example, one or more of the modules may comprise a module position sensor 226 which is arranged to detect either the position of the module itself (e.g. the position of module 204 in FIG. 2) or the position of one or more other modules in the set (e.g. the position of module 202 in FIG. 2). Where the position of another module is detected, characteristics of the separation of the two modules (e.g. distance between them) may be detected. Any suitable sensing technology may be used (e.g. visible light or IR) and in some examples, the wire-free communication element 212 may also be used as a module position sensor. In an example, one or more modules may comprise a module position sensor 226 which is a photodetector and may be arranged to detect visible light/IR emitted by an output device 218 (or other element) on another module and use the characteristics of the detected signal to determine the relative locations of the modules. For example, if a module comprises multiple photodetectors on different faces of the module, the relative position of other modules may be determined based on which photodetectors detect light/IR emitted by another module. Where the modules themselves detect their position or relative position, this information may be communicated to the touch-screen device via the wire-free communication element 212.

In other examples, the position of input/output modules may be detected by the touch-screen device itself. For example, a module may have a code or marker on an inner face which is in contact with the screen of the touch-screen device and which may be read by the touch-screen device, even if the module is positioned outside of the display area (e.g. as the touch-sensitive area may extend beyond the area used for display). In another example, the input/output module may comprise an output device 218 (e.g. an LED or other active indicator) on the inner face to enable it to provide an identifier or other signal to the touch-screen device (e.g. again as detected by the touch-sensitive display). In various examples, an input/output module may have a unique ID or a type identifier (e.g. 4-way control, 2 buttons, etc.) which is communicated to the touch-screen device using a code, marker, active indicator or other means (e.g. via the wire-free communication element 212) and this identifier may be used in the mapping.

In some examples, a target program (e.g. a game) may suggest positions for the input/output modules to the user (e.g. a program may advise the user where they consider the optimum position of modules to be). This information may be provided to the user as part of the program loading screens or other on-screen hints.

User inputs via the input controls on the input/output modules are mapped to user inputs in programs displayed/running on the touch-screen device, e.g. applications (such as games) or the OS, and the program with the user inputs that are the target of the mapping may be referred to as the 'target program'. This mapping may be performed automatically or there may be user involvement in the mapping. Where there is data communicated from the modules to the touch-screen device (e.g. identifiers, position information, data from the personal data store 224, etc) this information may be used when performing the mapping. Similarly, where the touch-screen device can determine information about the modules (e.g. their position or characteristics of the modules, such as what input control they include), this may also be used when performing the mapping.

The mapping itself may be performed by the target program itself or by another program running on the touch-screen device or by a program running remotely from the touch-screen device and various examples are described below with reference to FIGS. 4 and 5. Where the input/output modules communicate with the touch-screen device using Bluetooth®, any supported profile may be used, such as the Bluetooth® HID (Human Interface Device) profile which provides support for keyboards, joysticks and mice. Alternatively A2DP or HSP may be used instead of HID. If a different communication technology is used to communicate between the modules and the touch-screen device (e.g. Wireless USB), an appropriate supported profile may be used.

Figure 4:
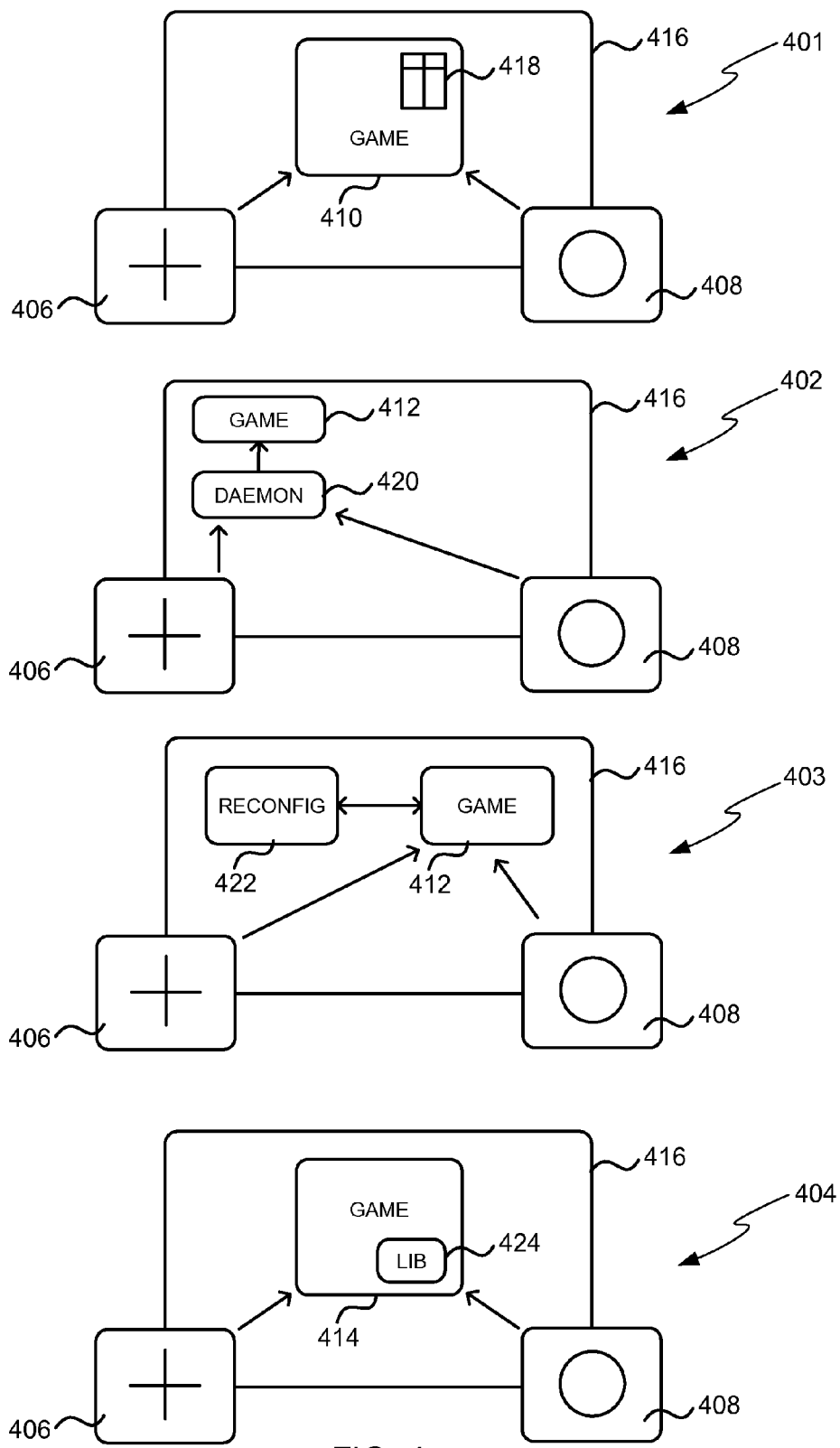
FIG. 4 shows schematic diagrams of four example methods of mapping inputs on an input/output module to a user input in a target program.

FIG. 4 shows schematic diagrams 401-404 of four example methods of mapping inputs on an input/output module 406, 408 to a user input in a game 410-414. It will be appreciated that a game is used as an example of a program which may run on a touch-screen device 416 and other examples of programs include the OS or other applications.

In the first example 401, the user input signals from the input/output modules 406, 408 are received by the game 410, e.g. using the Bluetooth® HID (or other HID), and the mapping of the user input signals to user inputs recognized by the game is performed by the game itself. In this example, the game 410 comprises a mapping table 418 which stores the mappings between an input signal (e.g. an input keystroke) and the corresponding user input in the game 410.

In the second example 402, a daemon 420 running on the touch-screen device 416 receives the input signals from the input/output modules 406, 408 (e.g. using the Bluetooth® HID) and then provides signals to the game 412 which simulate a touch event. The game 412 does not need to be modified in any way because the user input signals it received from the daemon 420 are exactly the same as it would otherwise receive from the OS running on the touch-screen device when the user provides an input via the touch-screen. In this way, the daemon can simulate (or spoof) any touch event or in some examples may be configured to spoof other events (e.g. detected sounds).

In a variation of the second example 402, the daemon 420 may be part of the OS on the touch-screen device 416 and may provide a configuration screen for the input/output modules 406, 408 in a similar way to configuring a mouse via the control panel in an existing OS. Irrespective of whether the daemon 420 is separate from or integrated within the OS, the mapping between input signals and touch events may be fixed, user-configurable, dynamic (e.g. dependent upon the application being used by the user) or any combination thereof.

In some computing environments and/or with some games, it may not be possible to have a second program (e.g. daemon 420) running on the touch-screen device 416 and providing the user input signals to the game (as is shown in the second example 402). In such situations, an arrangement as shown in the third example 403 may be used. In this example, a reconfiguration application 422 running on the touch-screen device 416 sends reconfiguration commands to the input/output modules 406, 408 which are dependent upon the game 412 that is about to be played on the touch-screen device 416. These commands are received by the modules and change the input signals that are sent by the modules to the game in response to any user input received at the modules. A different reconfiguration application may be used for different games or alternatively, a single reconfiguration application may be configured to send reconfiguration commands for more than one game (or other program). In this way, the mapping is dynamic and dependent upon the game. Alternatively, the reconfiguration may be dependent upon the particular touch-screen device 416 and may be run as a one-off operation to configure the input/output modules 406, 408 to work with the particular device 416.

In comparing the first, second and third examples, in the first example 401, it is the game 410 that is reconfigured in some way (e.g. to map received input signals to different user inputs within the game) whereas in the second example 402, an intermediary (daemon 420) performs the translation between signals received from the modules and the signals expected by the game 412 and in the third example 403, the operation of the modules 406, 408 is modified so that they output the input signals that are expected by the game 412. In all these examples, the mapping may be performed automatically or there may be some user involvement, e.g. to run the reconfiguration application 422 or to specify a particular mapping (e.g. to configure the reconfiguration application 422 or daemon 420).

In the fourth example 404, the game 414 may be written with reconfigurable input/output modules in mind (i.e. the game may be considered to be aware of reconfigurable input/output modules). In the example shown the game 414 comprises a library 424 which comprises different sets of mappings between input signals from input/output modules 406, 408 and user inputs within the game 414. Depending on the input signals received from the modules by the game 414, the game may select an appropriate set of mappings from the library to use. In an example, the modules may send an identifier signal when switched on which is used by the game to identify the appropriate set of mappings to select from the library. Alternatively, a user may select an appropriate set of mappings based on user preference (e.g. whether they are left or right-handed). In this example, the input signals from the input/output modules are not mapped through an existing mechanism (e.g. as in example 401 where a left button may be mapped to 'keyboard left arrow' and this may then be mapped in the game to 'turn left') but instead, the game receives the input signal from the peripheral and maps it directly to the game command (e.g. 'turn left') without using an intermediate mapping.

Figure 5:
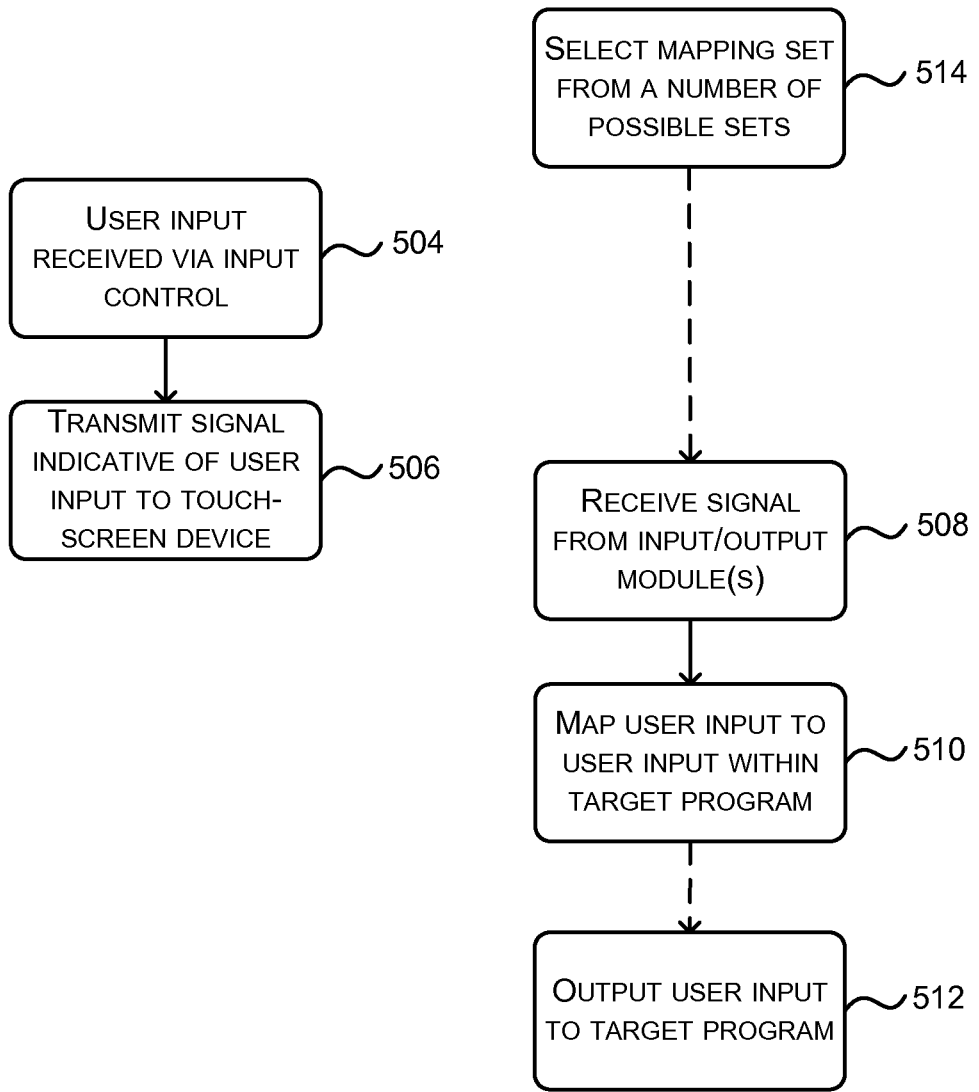
FIG. 5 shows a flow diagram of an example method of operation of the systems shown in FIGS. 4 and 7.
Figure 6:
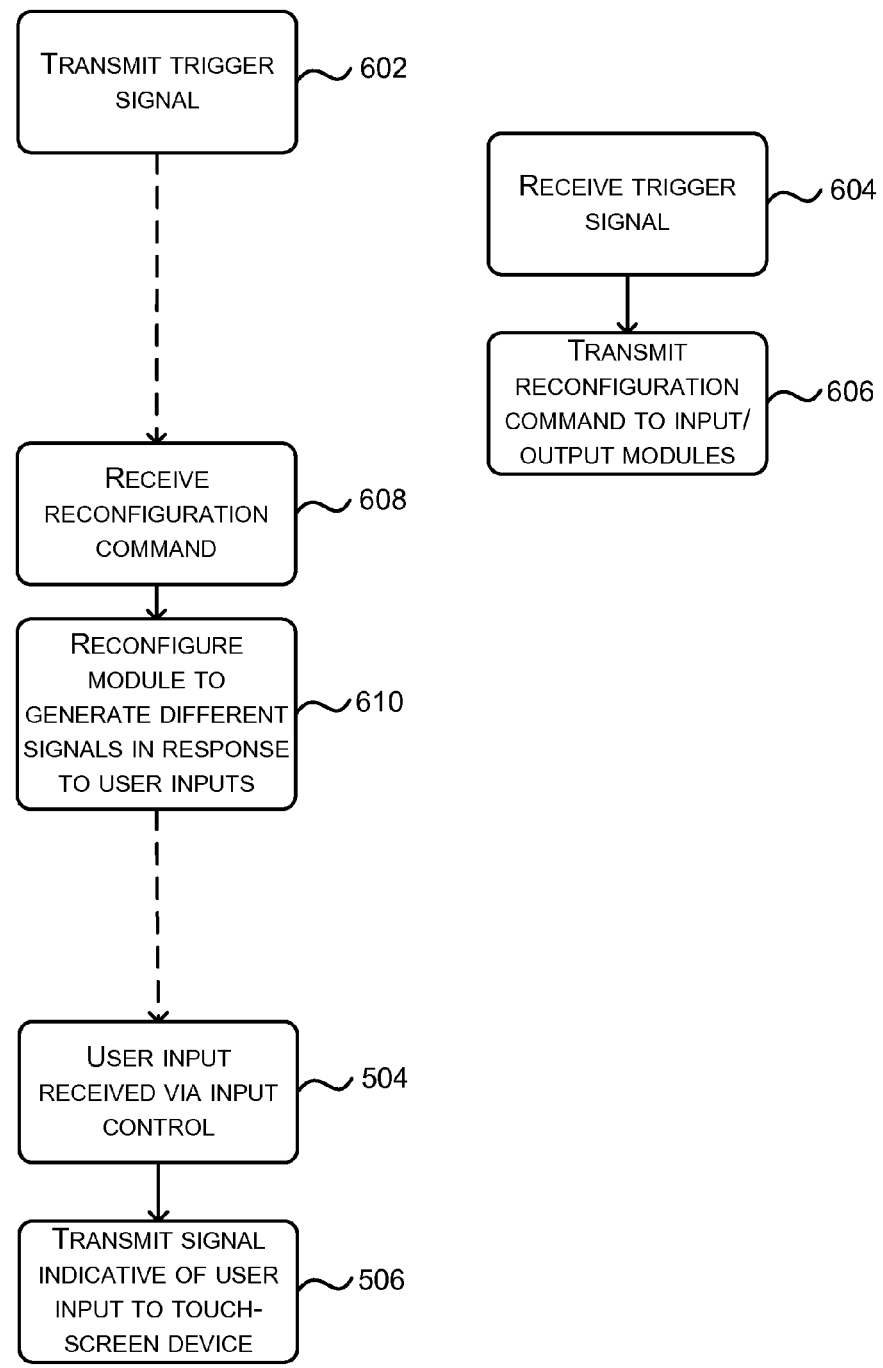
FIG. 6 shows a flow diagram of another example method of operation of the systems shown in FIGS. 4 and 7.

FIGS. 5 and 6 show flow diagrams for example methods of operation of the systems shown in FIG. 4. FIG. 5 corresponds to the first, second and fourth examples 401, 402, 404 in FIG. 4 although, as described below, block 512 may be omitted from the first and fourth examples and block 514 may be omitted from the first and second examples. FIG. 6 corresponds to the third example 403 in FIG. 4.

In FIG. 5 a user input is received on an input/output module (block 504), e.g. via an input control 216 as shown in FIG. 2. In response to this input, a signal is generated (e.g. by processor 210) and transmitted to the touch-screen device (block 506), e.g. using the wire-free communication element 212 in FIG. 2. This signal which is generated and transmitted (in block 506) is indicative of (or otherwise representative of) the particular user input that was received. For example, if the module comprises two input controls (e.g. two buttons as in module 106 in FIG. 1), a different signal is generated and transmitted if a user presses one button, compared to the user pressing the other button. These signals are then received by the touch-screen device (block 508) and these may be received by a program running on the device, where this program may be the target program (e.g. game 410 in the first example 401 in FIG. 4 or game 414 in the fourth example 404) or another program (e.g. daemon 420 in the second example 402). The receiving program then maps the received signal to a user input within the target program running on the touch-screen device (block 510), this user input within the target program may be referred to as the 'target user input'. Where the receiving program is not the target program (e.g. in example 402), a user input signal corresponding to the target user input is then output to the target program (block 512); however this step is omitted where the receiving program is the target program (e.g. in examples 401, 404). In some examples, (e.g. example 404), a mapping set may be selected from a number possible mapping sets (block 514) by the receiving program prior to performing the mapping (in block 510) and by selecting a different mapping set, a user input on an input/output module may be mapped to a different target user input. In an example, the different mapping sets (from which the selection is made in block 514) may correspond to different target programs.

In FIG. 6, a trigger signal is received on the touch-screen device (block 604) and these may be received by a reconfiguration application (e.g. reconfiguration application 422 in the third example 403 in FIG. 4). This trigger signal may have been sent by an input/output module (block 602) or may have been generated by another entity (e.g. by a program running on the touch-screen device which may, for example, be the target program). In response to receiving the trigger signal (in block 604), the reconfiguration application sends reconfiguration instructions to the input/output modules (block 606). It will be appreciated that different reconfiguration instructions may be sent to different input/output modules or the same instructions may be sent (e.g. broadcast) to all modules and the modules may determine which parts of those instructions need to be implemented by the receiving module. For example, referring to the module set shown in FIG. 4 which comprises a first module 406 with a four-way control and a second module 408 with a single button, different signals may be transmitted to each module or a signal may be transmitted which includes reconfiguration information for both a four-way control and a single button.

The reconfiguration instructions are received by the modules (block 608) and implemented (block 610). This implementation may change some or all of the signals which the input/output modules generate in response to user inputs. In some examples, implementation of the reconfiguration instructions (in block 610) may not cause any changes, e.g. where the reconfiguration instructions correspond to the current settings within the input/output modules. As described above, an input/output module may implement all the instructions contained in the reconfiguration signal or may implement a subset based on the particular input controls present on the module. When a user input is subsequently received at an input/output module (block 504), the signal which is generated (in block 506) is compliant with the reconfiguration instructions which were implemented (in block 610).

Figure 7:
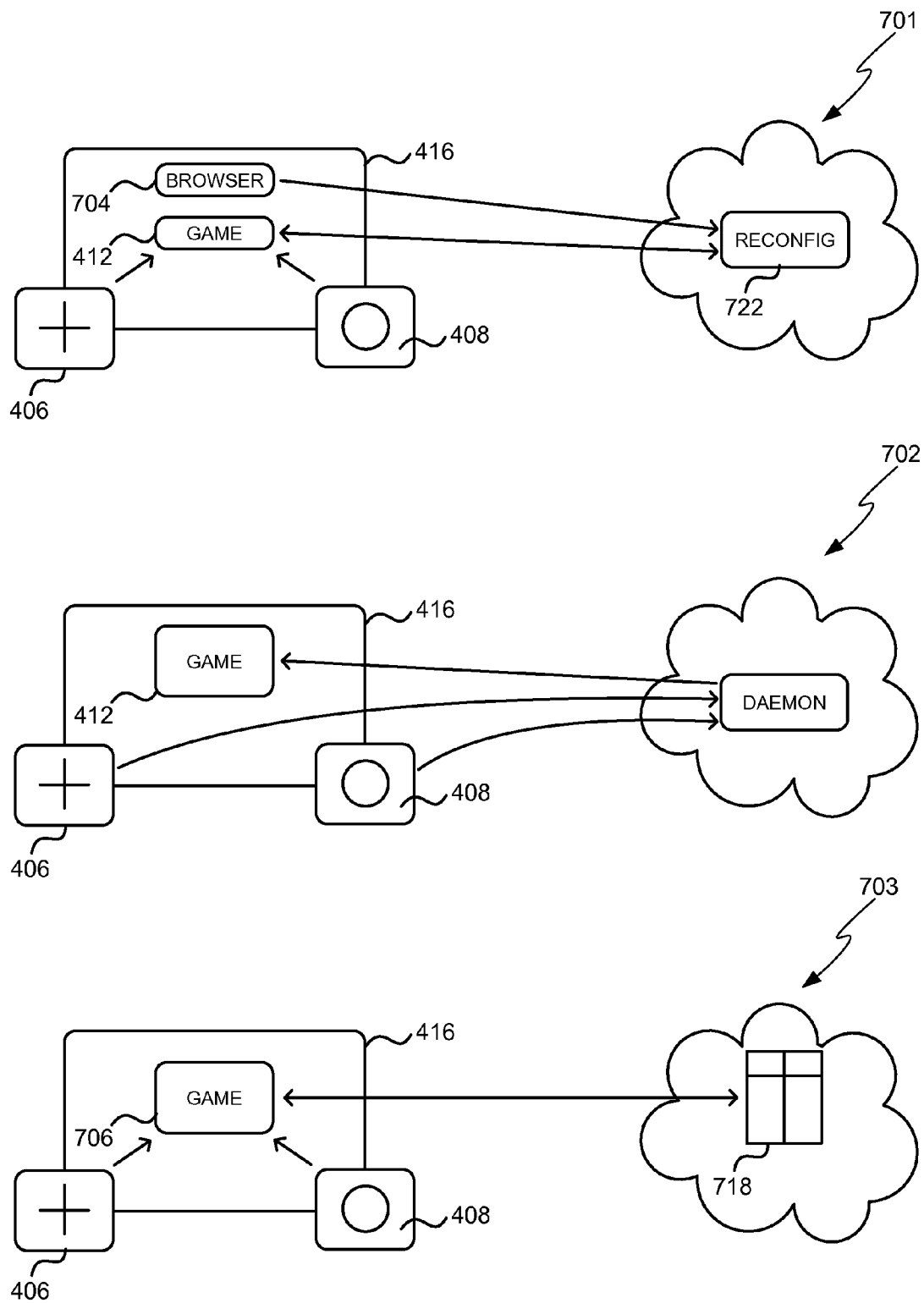
FIG. 7 shows schematic diagrams of three further example methods of mapping inputs on an input/output module to a user input in a target program.

In the examples shown in FIG. 4, the reconfiguration application 422, daemon 420 and mapping table 418 are stored locally on the touch-screen device 416. However, as shown in the examples of FIG. 7, these elements may alternatively be located remotely from the touch-screen device and may be accessed via a network (e.g. over the internet). In the first example 701, the reconfiguration application 722 runs as a web service on a remote server (e.g. a cloud service) and is accessed via a browser 704 running on the touch-screen device 416. In this example, the browser 704 opens a website which triggers the web service to reconfigure the modules 406, 408 according to the particular game 412 which is going to be played. Similarly, in the second example 702, the daemon 720 runs as a remote web service (e.g. a cloud service). As in the corresponding example in FIG. 4, the daemon 720 translates the signals from the modules into input signals which are recognized by the game 412. In the third example 703, there is an online database 718 which stores mapping data (e.g. in the form of a mapping table or various libraries) and which may be accessed by a game 706 and used to map the input signals received by the game from the input/output modules.

The example flow diagrams shown in FIGS. 5 and 6 are also applicable to the systems shown in FIG. 7. In the first example 701, which corresponds to the flow diagram shown in FIG. 6, the reconfiguration application 722 receives a trigger signal (block 604) and transmits reconfiguration commands (block 606) and it may be the browser 704 which transmits the trigger signal (in block 602). In the second example 702, which corresponds to the flow diagram shown in FIG. 5, the daemon 720 receives the signals from the input/output modules (block 508) and maps these to user inputs within the target program (block 510) before transmitting corresponding user input signals to the target program (block 512). In the third example 703, which also corresponds to the flow diagram shown in FIG. 5, the game 706 receives the input signals from the input/output modules (block 508) and uses the remotely stored mapping information 718 when performing the mapping (block 510). In some examples, the game 706 may select mapping information to use from the remote mapping information 718 (block 514) prior to performing the mapping (block 510).

In the examples described above, the target program is running on the touch-screen device. However, in some examples, the target program may be running on a separate device (e.g. a games console or smart TV, i.e. a television with interactive media capabilities) and the intermediary (e.g. the daemon described above) may be running on the touch-screen device. Such an example is shown in the schematic diagram in FIG. 8 and in this example the separate device is a games console 802 by way of example only. The game 804 is the target program, which runs on the separate device 802 and need not be modified to work with the input/output modules 406, 408. A daemon 806 running on the touch-screen device 416 receives the signals from the input/output modules 406, 408 (e.g. as in block 508 in FIG. 5), maps these to user inputs within the game 804 (e.g. as in block 510) and then transmits these to the game (e.g. as in block 512). In this way, the touch-screen device 416 with input/output modules 406, 408 and running daemon 806 (and which collectively may be denoted 808) can operate as a games controller for games console 802. By using different daemons or reconfiguring the daemon, the combined device 808 may operate as a controller or remote control for different devices (e.g. in addition to games console 802) and/or different target programs.

Figure 8:
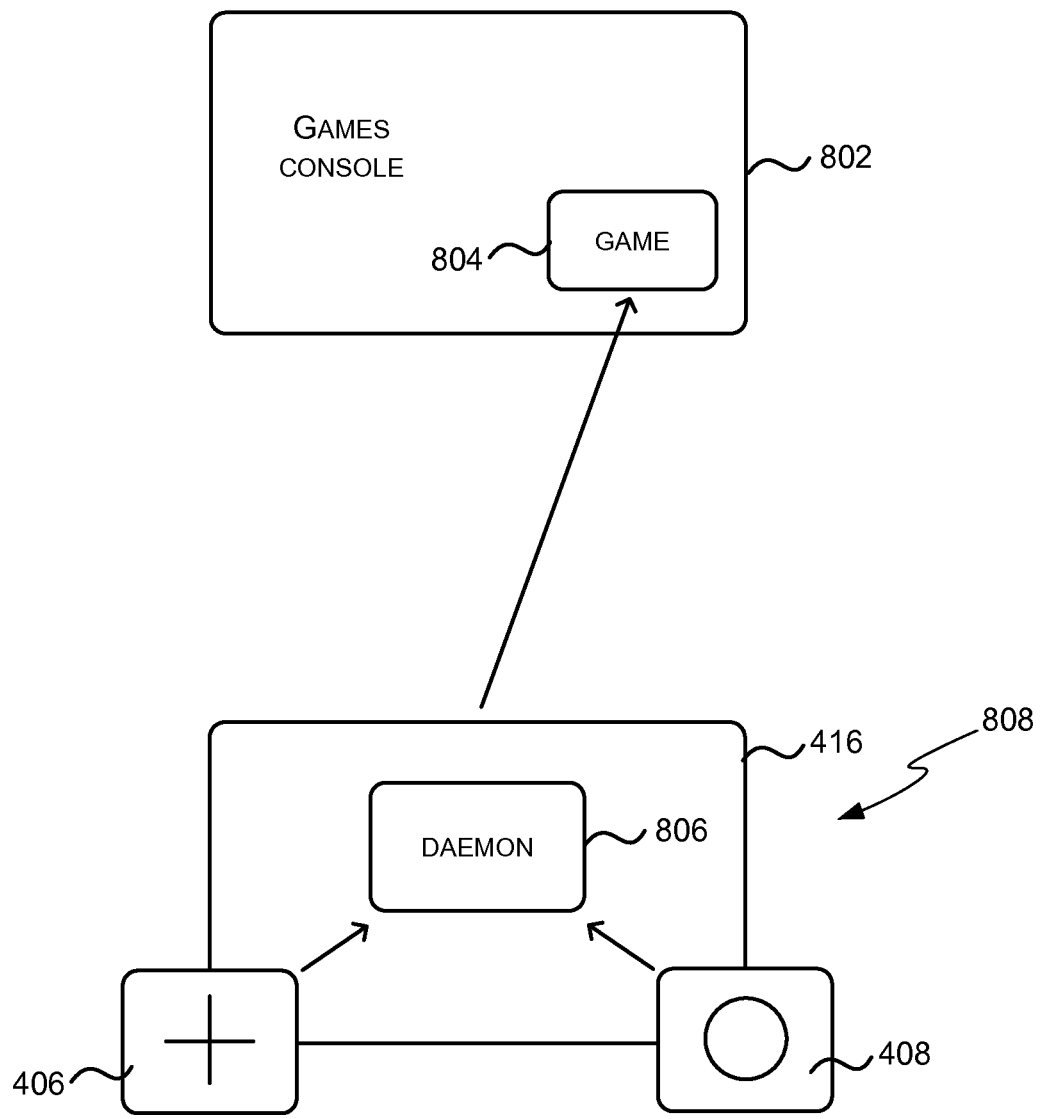
FIG. 8 shows schematic diagrams of another example method of mapping inputs on an input/output module to a user input in a target program.

FIG. 9 shows a schematic diagram of a games controller 902 which comprises two halves 904, 906, each of which is operable as an input/output module as described above when the two are separated from each other and the entire device 902 (when the two halves are joined together) operates as a standard games controller. When separated, the two halves can be attached around the periphery of a touch-screen device 908 in the same way as the input/output modules described above. When the two halves 904, 906 are attached to a touch-screen device, they may be used to provide user inputs to a target program running on the touch-screen device itself (e.g. as shown in FIGS. 4-7) or to a target program running on a separate device (e.g. as shown in FIG. 8). Where the games controller 902 uses a proprietary wireless protocol, each half 904, 906 may communicate (e.g. using a wire-free communication element 212) with the touch-screen device 908 via a communications module which may be connected to the touch-screen device using a wired connector (as described above).

It will be appreciated that the shape of the games controller 902 shown in FIG. 9 is by way of example only and the games controller may be of any shape. Depending on the size of the touch-screen device 908 and the games controller 902, the size of each half 904, 906 may not be much smaller than the touch-screen device 908 to which they attach, e.g. if the touch-screen device 908 is a smartphone rather than a tablet, (unlike the earlier schematic drawings of input/output modules).

Although the present examples are described and illustrated herein as being implemented to provide user inputs to games, the system described is provided as an example and not a limitation. As those skilled in the art will appreciate, the present examples are suitable for application in a variety of different types of target applications. Furthermore, although much of the description relates to hand-held or portable touch-screen devices (which may also be referred to as mobile computing devices), the examples may also be applied to fixed or non-portable touch-screen devices. In addition, although many of the examples described above relate to the modules being attached around the periphery of the mobile computing device, in other examples, they may be attached to other non-display portions of the device, such as the rear face of the device. In some examples, the attachment mechanism may attach to only non-display portions of the device and in other examples, the attachment mechanism may attach to both non-display portions and display portions of the device (e.g. the attachment mechanism may attach to a small part of the display, as well as to non-display portions, and still obscure little or none of the actual display area).

Touch-screen devices are an example type of computing devices which comprise a flat, continuous interaction surface. Although the description refers to use of input/output modules with a touch-screen device, the modules may alternatively be used with other devices which comprise a flat, continuous interaction surface (e.g. a surface which uses non-contact sensing such as depth sensor or eye tracker and may also provide other input means to a user such as pen, gesture and speech input).

Additionally, although the input/output modules described above are intended to be used when attached to a touch-screen device, it will be appreciated that they could be clipped to a case or housing of the touch-screen device or to other objects which are close to the touch-screen device such that the wire-free communication element can still communicate with the touch-screen device.

A removable input module for a touch-screen device is further described below. The module can be temporarily attached around the periphery of a touch-screen device (e.g. for a period of time when a user wishes to use it) and comprises one or more input controls (e.g. joystick, button, etc.) which are mapped to software (e.g. the operating system or an application) running on a computing device. Where the touch-screen device is a touch-screen computing device (e.g. a smartphone, tablet computer, etc.), the inputs are mapped to software running on the touch-screen computing device and where the touch-screen device is a peripheral (i.e. a touch-screen peripheral device) for a computing device (e.g. a touch-sensitive display for a desktop computer), the inputs are mapped to software running on that computing device.

Subsequently (e.g. when the user has finished interacting with the touch-screen device or when the module is not needed), the module can be detached from the touch-screen device and stored until it is next used by the user (e.g. connected to the same touch-screen device or a different touch-screen device). The removable input module also comprises an accelerometer (e.g. a 3-axis accelerometer) and/or a magnetometer, such as a Hall effect sensor, for determining an orientation of the input module relative to the touch-screen device and/or anther removable input module (e.g. where they are used in pairs).

As described above, when in use and/or when stored, the module may be attached to something other than a touch-screen computing device.

Examples of touch-screen computing devices include mobile/handheld devices (e.g. smartphones, tablet computers, phablets, portable games consoles) and larger devices (e.g. large form-factor tablet computers, surface computing devices, a touch-sensitive device integrated into an appliance or vehicle, touch-sensitive televisions), where the larger devices may be portable or non-portable. Examples of touch-screen peripheral devices include touch-sensitive displays for desktop computers, thin client tablets (e.g. which stream games from a console or data center), smart phones or tablets operating as a thin client display, etc. While many of the following examples refer to a touch-screen computing device, this is by way of example. The examples may also be applied to a touch-screen peripheral device, in which case any data communication is between the input module and the computing device to which the touch-screen peripheral device is connected.

Figure 10:
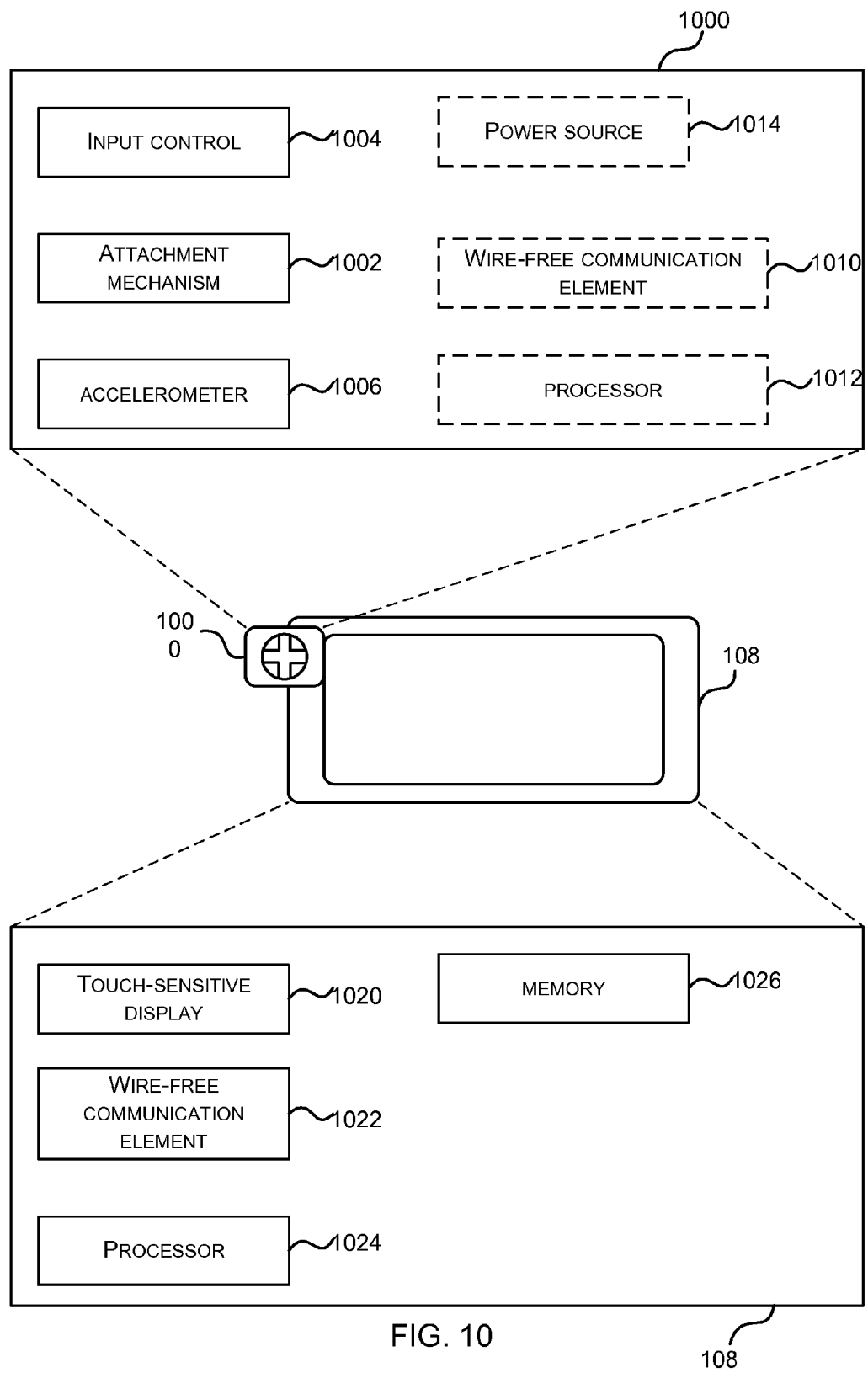
FIG. 10 is a schematic diagram of a first example removable input module.

FIG. 10 is a schematic diagram of a first example removable input module 1000. The input module 1000 comprises an attachment mechanism 1002 for attaching the module to a touch-screen device (e.g. a touch-screen computing device 108). As described above, the attachment mechanism 1002 enables the module to be temporarily attached to the touch-screen device such that it can be removed after use, repositioned, attached to other devices, etc. Many different attachment arrangements may be used, for example a clamping mechanism which grips the display surface (which in this description is referred to as the 'front' surface) and the rear surface of the touch-screen device. In other examples, the attachment mechanism 1002 may attach only to one surface (e.g. the rear surface) of the touch-screen device (e.g. using a suction device).

The input module 1000 further comprises at least one input control (or input device) 1004, examples of which are described above with reference to FIG. 1. Additionally, the input module 1000 comprises an accelerometer 1006 for determining an orientation of the input module 200 relative to the touch-screen device and/or another input module. Alternatively, as shown in the second example removable input module 1100 in FIG. 11, the input module may comprise a Hall effect sensor 1106 (instead of an accelerometer) for determining the orientation of the input module 1100 relative to the touch-screen device and/or another input module. In a further example, an input module may comprise both an accelerometer and a Hall effect sensor and in such examples, either or both of the accelerometer and the Hall effect sensor may be used to determine the orientation of the input module relative to the touch-screen device and/or another input module. Although the examples described herein refer to use of a Hall effect sensor 1106, in variations of any of the examples described herein a different type of magnetometer may be used instead of, or in addition to, a Hall effect sensor.

Figure 12:
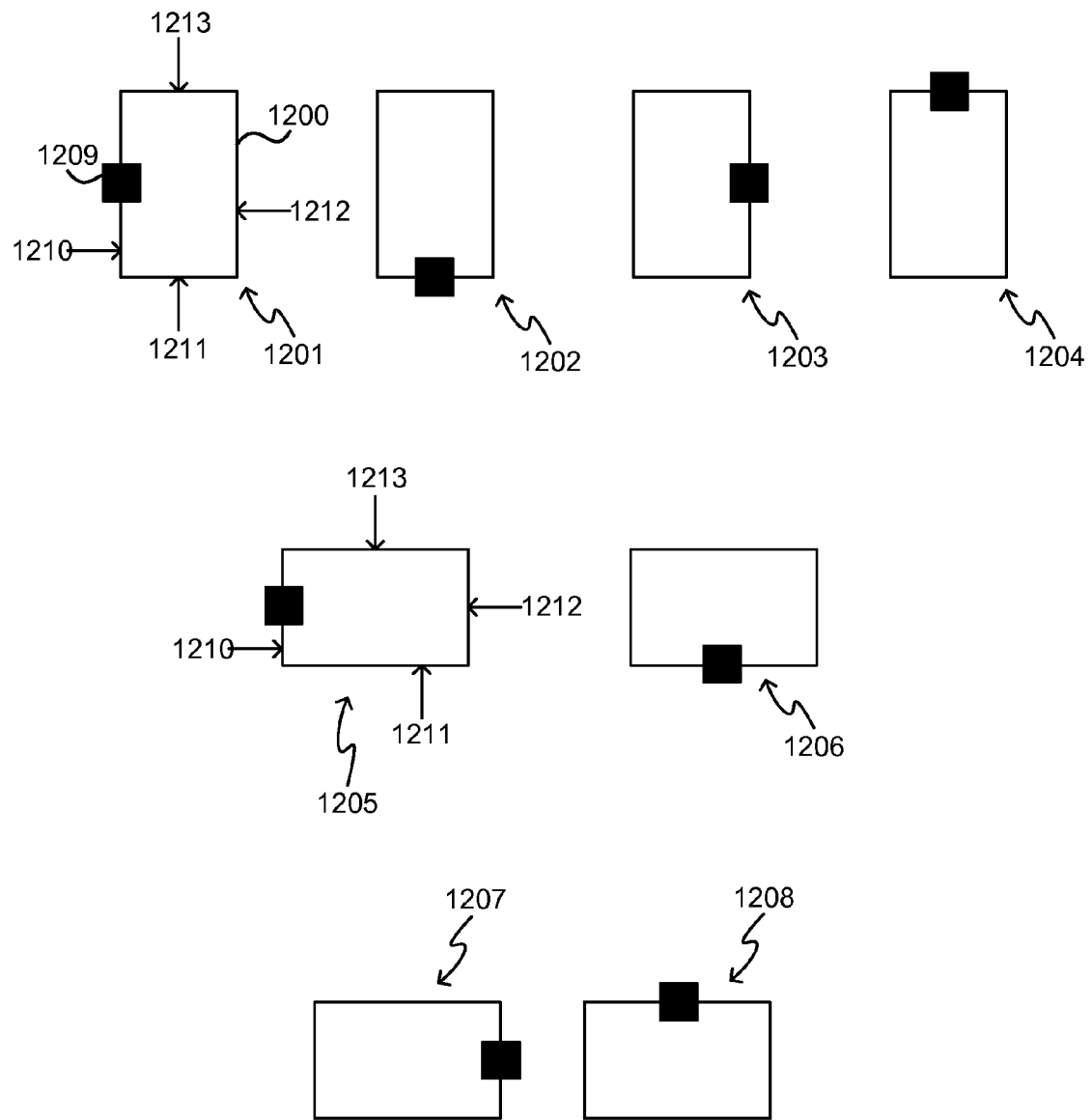
FIG. 12 is a schematic diagram showing a plurality of different positions of the input module when attached to a touch-screen device.

For example, the accelerometer 1006 and/or a Hall effect sensor 1106 may be used to determine whether the input module 1209 is attached to the left/bottom/right/top edge of the touch-screen device 1200. This is shown in FIG. 12, with examples 1201 and 1205 showing the module 1209 attached to the left edge 1210 of the touch-screen device 1200 (in its current viewing orientation which may be portrait as in example 1201 or landscape as in example 1205), examples 1202 and 1206 showing the module 1209 attached to the bottom edge 1211, examples 1203 and 1207 showing the module 1209 attached to the right edge 1212 and examples 1204 and 1208 showing the module 1209 attached to the top edge 1213. In addition, or instead, the accelerometer 1006 and/or Hall effect sensor 1106 may be used to determine the current viewing orientation of the touch-screen device 1200, for example whether it is portrait (as in examples 1201-1204) or landscape (as in examples 1205-1208). The operation of the accelerometer 1006 and Hall effect sensor 1106 is described in more detail below.

The input module 1000, 1100 may further comprise a wire-free communication element 1010 for transmitting orientation data (e.g. as determined using the accelerometer 1006 and/or Hall effect sensor 1106) to the computing device running the software displayed on the touch-screen device (e.g. to the touch-screen computing device). The orientation data received may cause the software to change its operation, e.g. the layout of its graphical user interface (GUI). For example, the software may correlate on-screen effects (e.g. within a computer game) with the position of the input module 1000, 1100. In various examples, the interpretation of the output of the accelerometer 1006 and/or Hall effect sensor 1106 may be performed within the input module 1000, 1100 (e.g. by a processor 1012) and in other examples, the interpretation of the output of the accelerometer 1006 and/or Hall effect sensor 1106 may be performed by the touch-screen computing device using orientation data received from the input module 1000, 1100 (e.g. via the wire-free communication element 1010). In yet further examples, the interpretation of the output of the accelerometer 1006 and/or Hall effect sensor 1106 may be performed by a remote computing device (e.g. located in a data center).

The input module 1000, 1100 may further comprise a processor 1012 (such as a microcontroller, microprocessor or any other suitable type of processor for processing computer executable instructions) which controls the operation of the module, e.g. to determine its orientation using the output of the accelerometer 1006 and/or Hall effect sensor 1106 (and hence generates the orientation data transmitted by the wire-free communication element 1010). In other examples, however, the raw sensor data (generated by the accelerometer 1006 and/or Hall effect sensor 1106) may be transmitted by the wire-free communication element 1010 and the processing of that data to determine orientation may be performed by the touch-screen computing device.

In some examples, for example where a system on a chip architecture is used, the processor 1012 may include one or more fixed function blocks (also referred to as accelerators) which implement a part of the method of operation of the module in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Figure 11:
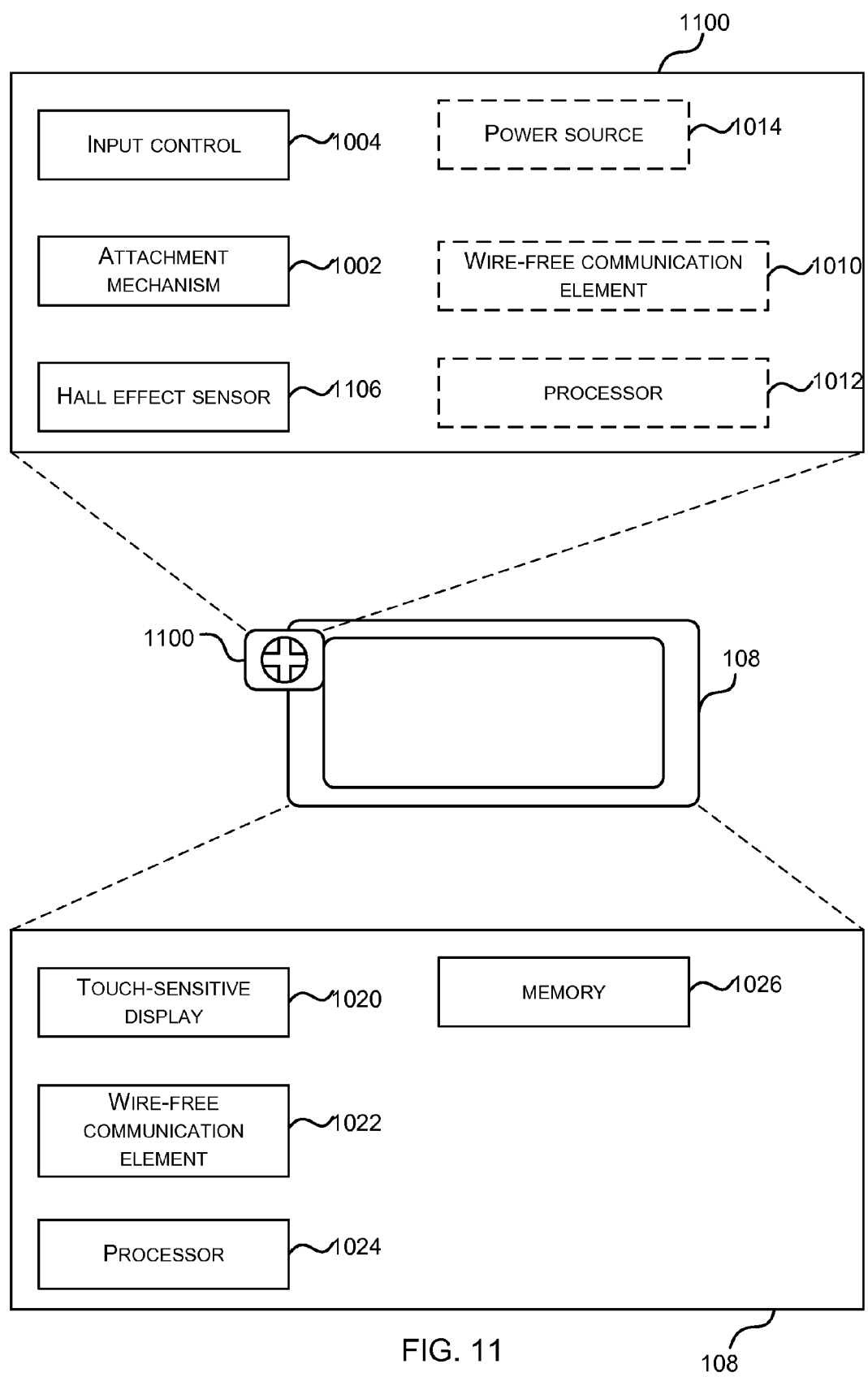
FIG. 11 is a schematic diagram of a second example removable input module.

Although FIGS. 10 and 11 show the processor 1012 separately from the accelerometer 1006 and Hall effect sensor 1106, in some examples, the processor 1012 may be integrated into the same device (e.g. the same silicon chip) as the accelerometer 1006 and/or Hall effect sensor 1106.

The computer executable instructions which are executed by the processor 1012 may be provided using any computer-readable media that is accessible by the input module 1000, 1100. Computer-readable media may include, for example, computer storage media such as memory within the input module (not shown in FIGS. 10 and 11) and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (e.g. memory) may be within the input module, in other examples it may be distributed or located remotely and accessed via a network or other communication link (e.g. using wire-free communication element 1010).

The input module 1000, 1100 may also comprise a power source 1014, which may, for example, be a battery, super capacitor or fuel cell. Super capacitors have an extremely short charge time compared to batteries (e.g. a 10 second charge may be sufficient to power the module for about an hour of normal use) which makes them particularly suited to this application. Where super capacitors or rechargeable batteries are used, the module may further comprise charging circuitry (not shown in FIG. 10 or 11). The charging circuitry may take power from a mains electricity supply or may draw power from the touch-screen device (e.g. via a USB or proprietary connector on the device or using a wireless charging mechanism).

In the example input module 1000 shown in FIG. 10, an accelerometer 1006 is used to determine the orientation of the input module 1000 relative to a touch-screen device and/or another input module. As described above, the analysis of the output of the accelerometer 1006 may be performed on the input module 1000 or by the touch-screen computing device.

Where the analysis of the output of the accelerometer 1006 is performed by the input module 1000, the direction of the acceleration due to gravity (e.g. $g=9.81$ m/s$^2$) as detected by the accelerometer 1006 may be determined and from this the orientation of the input module 1000, 1100 can be determined. Hence, as long as the touch-screen device is not perfectly horizontal, the edge of the touch-screen device to which the module is attached (e.g. as shown in FIG. 12) can be determined. By performing the analysis on the input module 1000, there may be less data that is transmitted by the wire-free communication element 1010. In various examples, the input module 1000 may also comprise a magnetometer which can detect the earth's magnetic field to enable orientation to be determined when the touch-screen device is perfectly horizontal.

Where the analysis of the output of the accelerometer 1006 is performed by the touch-screen computing device (instead of in an input module), the relative orientation may be determined by correlating the raw x,y,z acceleration data from an accelerometer in each unit (e.g. in each input module and in the touch-screen computing device).

In various examples the accelerometer data (e.g. the direction of the acceleration due to gravity) as measured by the accelerometer 206 in the input module 200 may be compared with the accelerometer data generated by an accelerometer within the touch-screen device, e.g. a stream of accelerometer data from each may be compared. If the module and touch-screen device can communicate with each other and their accelerometer data matches (e.g. by looking at the magnitude of the overall vector of acceleration and in some examples also changes in the angle of this vector) it may be concluded that the module is connected to the touch-screen device.

In various examples the accelerometer data as measured by the accelerometer 1006 in the input module 1000 may be compared with the accelerometer data generated by an accelerometer 1006 within another input module 1000. If the modules can communicate with each other and changes in their accelerometer data correspond (i.e. they both experience the same changes in accelerometer data over a period of time) it may be concluded that both modules are connected to the same object (e.g. to the same touch-screen device). This may, for example, be used where the input modules are provided in sets (e.g. in pairs) to determine whether more than one module from the set has been attached to the same touch-screen device.

In addition to using the output of the accelerometer to determine relative orientation, the accelerometer data may also be used as an input to a computer game. For example, as part of game play a user may detach an input module and shake it or tap it against something.

In the example input module 1100 shown in FIG. 11, a Hall effect sensor 1106 is used to determine the orientation of the input module 1100 relative to a touch-screen device and/or another input module. The Hall effect sensor generates an output voltage (i.e. an output signal) in response to a magnetic field which is created by a speaker (or multiple speakers) within the touch-screen device. In addition, or instead, the Hall effect sensor may generate an output voltage in response to a magnetic field created by one or more other magnets within the touch-screen device (e.g. a magnet for attaching a power connector or keyboard). The mapping between the output of the Hall effect sensor 1106 and an orientation (e.g. one of the orientations shown in FIG. 12) may use a look-up table and/or knowledge of the type (e.g. make and model) of touch-screen device to which the input module is attached. For example, an output voltage V1 may correspond to the orientation shown in example 1201 for touch-screen device A and an output voltage V2 may correspond to the same orientation for touch-screen device B where the speaker arrangement is different in the two touch-screen devices. In various examples, a calibration step may be performed initially to generate data for a look-up table, e.g. a user may be asked to attach the input module 1100 at the 4 positions shown in examples 1201-1204 in FIG. 12 in a particular sequence and the output of the Hall effect sensor 1106 may be stored for each position. Subsequently, the output of the Hall effect sensor 1106 can be compared to the stored values to determine the current orientation of the input module with respect to the touch-screen device. The relative orientation of two input modules may be determined by first determining the relative orientation of each of the input modules to the touch-screen device.

By using a Hall effect sensor 1206, or multiple Hall effect sensors 1106 at different orientations within the input module 1200, to detect the magnetic field generated by a speaker in the touch-screen device, the coarse positioning of the input module may be determined as well as the orientation. For example, using a look-up table and/or inference between known points (e.g. points at which an input module is attached as part of a calibration sequence), the output of the Hall effect sensor(s) 1106 may be used to determine the approximate position of an input module along a particular edge of the touch-screen device (e.g. along the left edge 1210, the bottom edge 1211, the right edge 1212 and the top edge 1213 shown in FIG. 12).

As described above, the analysis of the output of the Hall effect sensor 306 to determine orientation and/or approximate position may be performed on the input module 300 or by the touch-screen computing device.

In various examples, a Hall effect sensor in an input module may be used to detect the position of an input control (e.g. a trigger or joystick) on the input module and this may be the same Hall effect sensor 306 which is used to detect orientation or a different Hall effect sensor (e.g. a second Hall effect sensor or a Hall effect sensor used in combination with an accelerometer 206 for detecting orientation). The Hall effect sensor which is used to detect the position of an input control may be in the input control or may be in the body of the input module (and hence not in the input control).

In a first example implementation, a Hall effect sensor within the input control detects the magnetic field generated by the speaker and changes in the output of the Hall effect sensor (e.g. compared to when the input control is not being activated) may be analyzed to detect trigger movements.

In a second example implementation, a magnet (e.g. a permanent magnet or electromagnet) may be provided within the input control. A Hall effect sensor in the module body (i.e. not in the input control) will generate an output voltage in response to the magnetic field generated by both the magnet in the input control and the magnetic field generated by the speaker in the touch-screen device. In such an implementation, the effect of the speaker on the output of the Hall effect sensor may be calibrated out (e.g. by again looking for changes in the output voltage compared to a background value when the input control is not being activated).

In a third example implementation, a Hall effect sensor in an input control may detect the magnetic field generated by both the speaker in the touch-screen device and a magnet in the module (e.g. in the module body). Like in the second implementation, the effect of the speaker on the output of the Hall effect sensor (which may be constant) may be calibrated out.

Irrespective of whether the touch-screen device comprises a speaker, a Hall effect sensor may be used in the input module to reduce the complexity of the electrical design and manufacturing/assembly processes for the input module where the input module comprises input controls on both its front and rear faces. In many examples, both front and rear faces comprise electrical components and so may be considered "active" and an electrical connection is provided between the front and rear faces. However, as described below with reference to FIG. 13, a Hall effect sensor may be used in the input module such that only one face (e.g. the front or the rear face) is active.

Figure 13:
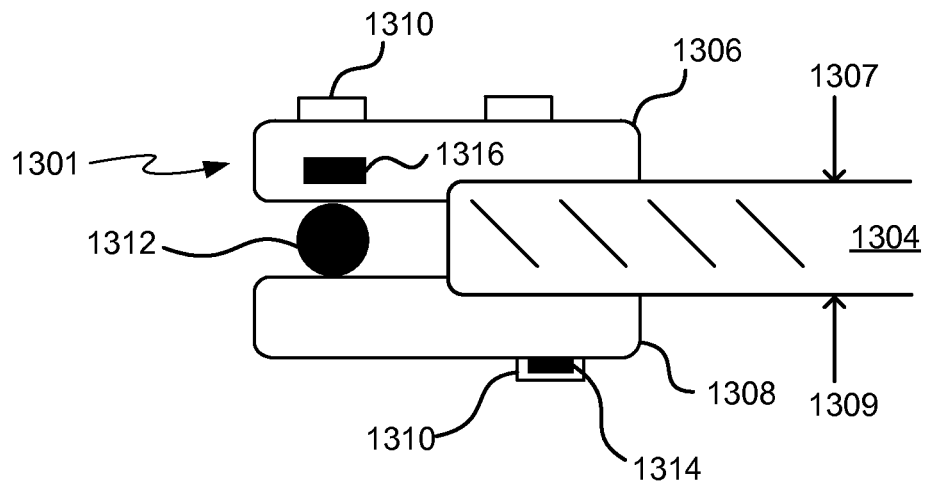
FIG. 13 shows two schematic diagrams each of which depicts an input module attached to a touch-screen device.
Figure 13:
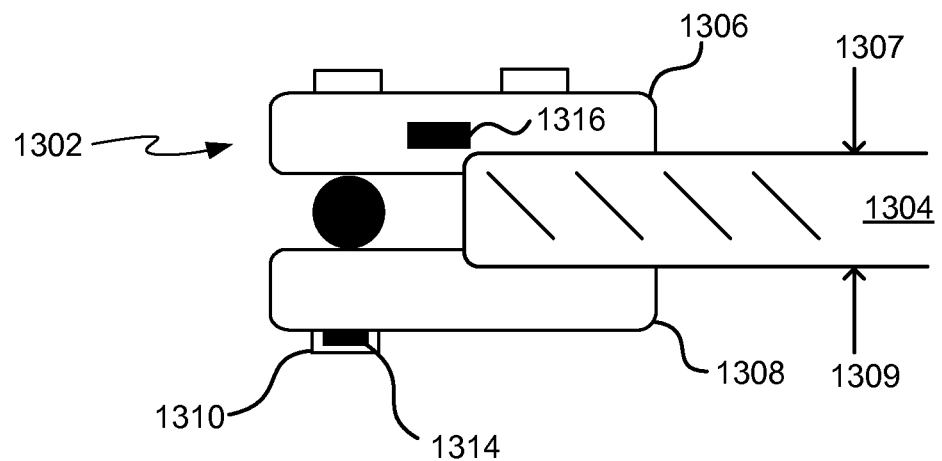

FIG. 13 shows two schematic diagrams each of which depicts an input module 1301, 1302 attached to a touch-screen device 1304. Both input modules 1301, 1302 are formed from a front portion 1306 which contacts the front (i.e. display) face 1307 of the touch-screen device 1304 and a rear portion 1308 which contacts the rear face 1309 of the touch-screen device 1304. Both the front and rear portions 1306, 1308 comprise input controls 1310 and the two portions 1306, 1308 are connected together such that the input module 1301, 1302 grips the touch-screen device 1304. In the examples shown in FIG. 13, the front and rear portions 1306, 1308 are connected by a pivot 1312 and a spring arrangement provides the clamping force onto the touch-screen device 1304. In other examples, other arrangements (e.g. of springs) may be used.

In both examples in FIG. 13, the front portions 1306 comprise electrical components and may be considered to be "active" whilst the rear portions 1308 do not comprise any active electrical components (although in other examples, the rear may be active and the front may not). This means that it is not necessary to provide any electrical connections between the front and rear portions of the input module and this reduces the complexity of the electrical design, the manufacturing process and may improve the manufacturing yield and/or module reliability. In order to detect when a user operates an input control 1310 on a rear portion 1308, the input control contains a magnet 1314. The magnetic field of this magnet 1314 affects the output voltage of a Hall effect sensor 1316 in the front portion 1306 and by analyzing this output voltage, user interaction with the input control (e.g. the user moving a joystick or pressing a button) can be detected. The analysis of the output of the Hall effect sensor 1316 may be performed on the input module or by the touch-screen computing device.

As shown in FIG. 13, the magnet 1314 and Hall effect sensor 1316 are positioned such that shielding of the magnetic field of the magnet by the touch-screen device 1304 is reduced/minimized/avoided.

In addition to, or instead of, using a Hall effect sensor to detect orientation and/or user inputs (by detecting movement of an input control), a Hall effect sensor in an input module may be used to determine the thickness of the touch-screen device, to determine the type of touch-screen device and/or to determine an operational state of the input module. The thickness of the touch-screen device may, for example, be determined by comparing outputs of the Hall effect sensor when not attached to anything and when attached to the touch-screen device (e.g. where the output will change as a result of changing the separation of the Hall effect sensor in one portion and a magnet in the other portion of the module or as a result of some shielding of the magnetic field by the touch-screen device). The type of touch-screen device may be determined based on a thickness determination and/or the output of the Hall effect sensor as a consequence of the speaker(s) in the touch-screen device (e.g. with different touch-screen devices having different 'signature' sensor output values as a result of different speaker configurations, where the signature may be determined based on a single position of the input module or on multiple positions of the input module). Detection of operational state is described in more detail below.

In various examples the Hall effect sensor output for one input module may be compared with the Hall effect sensor output within another input module. If the modules can communicate with each other and the Hall effect sensor outputs identify a touch-screen device of the same thickness and/or type it may be concluded that both modules are connected to the same object (e.g. to the same touch-screen device).

Figure 14:
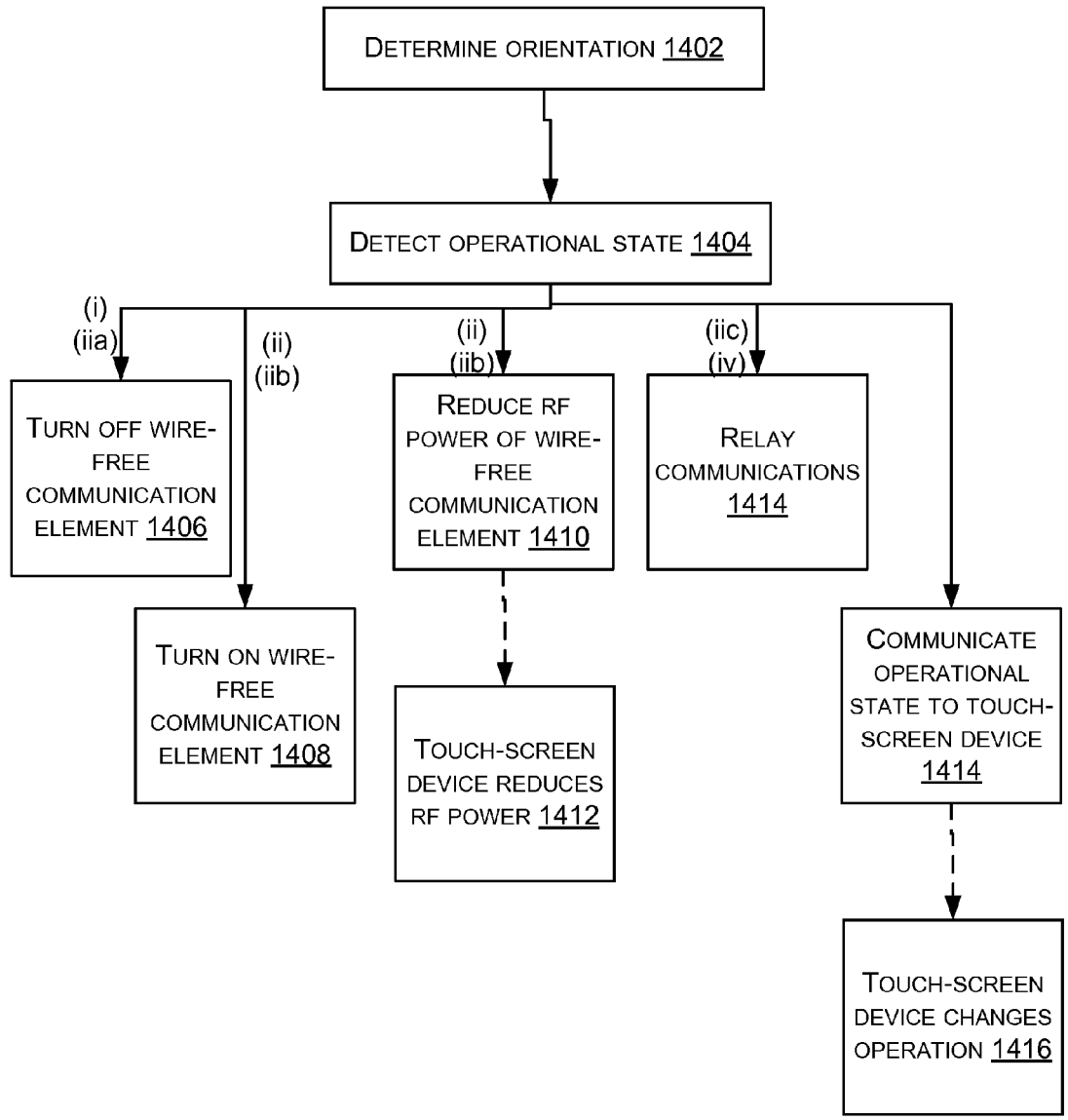
FIG. 14 is a flow diagram of an example method of operation of an input module as described herein or of a touch-screen device to which an input module is attached.

An input module (e.g. input module 1000 or 1100) as described herein may comprise a sensor (or a plurality of sensors) arranged to detect an operational state (or attachment state) of the input module. The sensor(s) used may comprise the same sensor that is used to determine orientation (e.g. accelerometer 1006 or Hall effect sensor 1106) and/or may comprise other sensors. The sensor(s) are arranged to detect operational state at a more detailed level of granularity than just "attached" or "not attached" and in various examples may identify the operational state from a set of possible states comprising two or more of:

i) Not attached to anything ii) Attached to a touch-screen device iii) Attached to an object which is not a touch-screen device iv) Attached to a dock In various examples, one or more of these states may have two or more sub-states, for example:

iia) Attached to a touch-screen device which is switched on iib) Attached to a touch-screen device which is switched off iic) One of a plurality of input modules attached to a touch-screen device iva) Attached to a dock and charging ivb) Attached to a dock and not charging FIG. 14 is a flow diagram of an example method of operation of an input module as described herein or of a touch-screen device to which an input module is attached. As shown in FIG. 14 and described above, based on an output of an accelerometer 1006 or Hall effect sensor 1106, the input module 1000, 1100 may determine an orientation of the input module relative to a touch-screen device and/or another input module (block 1402). This determination may be performed by a processor 1012 within the input module or alternatively may be performed by a touch-screen computing device to which the input module is attached.

In addition (or instead), the input module may determine its operational state based on the output of one or more sensors, which may include the sensor used to determine orientation (block 1404). The determination may be performed by a processor 1012 within the input module. A switch/sensor within the attachment mechanism 1002 may be used to detect when the module is not attached (state (i) above). A Hall effect sensor may, for example, be used to detect whether the module is attached to a touch-screen device (state (ii) above), i.e. by detecting the magnetic field generated by the speaker in the touch-screen device (as described above). The sensor(s) used to detect whether the touch-screen computing device is switched on or not (state (iia) or (iib) above) may comprise a photodetector (to detect any light from the display screen, with no light indicating that the device is switched off or otherwise in a low power state) or the wire-free communication element 1010 (where if no signals from the touch-screen device are detected, this may be considered to indicate that the device is off or in a low power state). Alternatively, where the sub-states are not differentiated, a photodetector or the wire-free communication element may be used to detect when the input module is attached to a touch-screen device (state (ii) above). A combination of a switch/sensor within the attachment mechanism 1002 and a Hall effect sensor or photodetector may be used to detect when the module is attached to an object which is not a touch-screen device (state (iii) above), e.g. when the switch/sensor in the attachment mechanism senses that the input module is attached to something, but the output of the Hall effect sensor or photodetector does not indicate the presence of a touch-screen device. The sensor(s) used to detect that the input module is attached to a dock may comprise a Hall effect sensor (e.g. to detect a characteristic magnetic field generated by one or more magnets within the dock). A sensor within the charging mechanism may be used to determine whether an input module is charging or not (to distinguish between sub-states (iva) and (ivb) above).

In response to determining the operational state, the operation of the input module (and in some examples also the touch-screen device) may be modified and various examples are shown in FIG. 14. For example, a wire-free communication element 1010 in the input module may be switched off (block 1406) if the input module is not attached to anything (state (i) above) or attached to a touch-screen computing device which is switched off (state (iia) above).

In contrast, the wire-free communication element 1010 may be switched on (block 1008) if the input module is attached to the touch-screen device (state (ii) above) or only if the input module is attached to a touch-screen device which is switched on (state (iib) above).

The transmission (e.g. RF) power emitted by the wire-free communication element 1010 may be reduced (block 1410) in response to determining that the input module is attached to the touch-screen device (state (ii) above); however, if the wire-free communication element 1010 is only switched on when the input module is attached to a touch-screen device which is itself switched on, the transmission (e.g. RF) power may only be reduced in this sub-state (sub-state (iib) above). In various examples, the touch-screen device may also reduce its transmission (e.g. RF) power (e.g. of wire-free communication element 1022) when the input module is attached (block 1412).

In various examples, the wire-free communication element 1010 may change the way it operates in response to determining that the input module is attached to a dock (state (iv) above) or is one of a plurality of modules attached to the same touch-screen device (state (iiic) above). In this operational state, the entity with which the input module communicates may change from a first entity (the touch-screen device) to a second entity (the dock or another input module). For example, communications between the input module and the touch-screen computing device may be relayed via the dock or via another input module (block 1414). For example, where more than one input module is connected to the same touch-screen computing device, one module may act as the master and communicate with the touch-screen computing device whilst the other module(s) act as slaves and communicate only with the master input module.

By switching on and off, or reducing the power of, the wire-free communication element 1010 (in blocks 1406, 1408 and 1410) using the methods described above, the overall power consumption of the input module is reduced and so the operating life of the input module (e.g. between re-charging) is increased. The power consumption may also be reduced by relaying communications via a single master device (e.g. the dock or an input module) as described above (in block 1414).

In various examples and depending upon the operational state detected, the input module may communicate the operational state data (or the change in operational state) to the touch-screen device (e.g. via the wire-free communication element 1010). For example, if an input module was connected to a touch-screen device which is on (state (iia) above) and is then detached from the touch-screen device (a change to state (i) above) this may be communicated to the touch-screen device (block 1414) and in this example, the wire-free communication element may not be switched off (block 1406 omitted) or the switch off may be delayed (e.g. block 1406 implemented after a delay and only if the user does not press any input controls for a defined period of time).

In response to receiving data indicating a change in operational state, the touch-screen computing device (or, for a touch-screen peripheral device, the computing device to which it is connected) may also change the way it operates (block 1416). For example, a computer game may require a user to detach an input module and then interact with it (e.g. shake it) when detached as part of the game play. In this way, the removable input module(s) may be used to augment game play on a touch-screen device in addition to providing more ergonomic user input controls and/or additional user input controls compared to the available on-screen input controls.

As described above, the sensor data generated within an input module (e.g. by the accelerometer 1006, Hall effect sensor 1106 and/or any other sensors) may be analyzed within the input module (e.g. by a processor 1012) and/or by a touch-screen computing device to which the input module is attached. In some examples, the data may in addition, or instead, be analyzed by a remote computing device (e.g. a server in a remote data center) and the touch-screen device may forward the sensor data to that remote computing device for interpretation/analysis.

An input module comprises either an accelerometer 1006 or a Hall effect sensor 1106 for determining orientation of the module and may comprise one or more other sensors such a photodetector, pressure sensor, etc. In various examples one or more of the sensors may be used to detect an operational (or attachment) state of the input module as described above. In various examples, additional sensors may be provided which are used to detect characteristics of the user (e.g. heart rate, galvanic skin response) and these may, for example, be used by the software running on the touch-screen device (or computing device connected to a touch-screen peripheral device) to determine user engagement.

In various examples, the input module described herein may further comprise a mechanism for linking (e.g. pairing) the input module to the touch-screen device. In an example, the input module may comprise an NFC tag which may be read by an NFC reader within the touch-screen device. In another example, an input module may comprise an LED which is arranged (e.g. under the control of a processor 1012) to flash a light pattern which can be captured by a camera integrated within the touch-screen device. The data which is transferred to enable the pairing (e.g. via the NFC tag or LED) may, for example, comprise a wireless identifier (e.g. a Bluetooth® ID) or other identifier which can be used to link the input module to the computing device such that user input via the input controls on the input module is mapped to software running on the linked computing device.

The touch-screen device 108 described herein comprises a touch-sensitive display 1020 (as shown in FIGS. 10 and 11) and where the touch-screen device is a touch-screen computing device it further comprises an input for receiving data from the input module (e.g. a wire-free communication element 1022, which may be a wireless receiver), one or more processors 1024 and memory 1026.

The one or more processors 1024 may be microcontrollers, microprocessors or any other suitable type of processor for processing computer executable instructions to control the operation of the device. In some examples, for example where a system on a chip architecture is used, the processor 1024 may include one or more fixed function blocks (also referred to as accelerators) which implement a part of the method of operation of the touch-screen computing device in hardware (rather than software or firmware) . Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions which are executed by the processor 1024 may be provided using any computer-readable media that is accessible by the touch-screen device 108. Computer-readable media may include, for example, computer storage media such as memory 1026 and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (e.g. memory 1026) may be within the input module, in other examples it may be distributed or located remotely and accessed via a network or other communication link (e.g. using wire-free communication element 1022).

Either or both the input module 1000, 1100 and the touch-screen device 108 may comprise Natural User Interface (NUI) technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although many of the present examples are described and illustrated herein as being implemented in a system comprising an input module and a touch-screen computing device, the system described is provided as an example and not a limitation. As those skilled in the art will appreciate, the present examples are suitable for application in a variety of different types of systems which comprise a touch-screen device to which an input module can be attached and the computation may be performed in a separate device which may be proximate to (e.g. attached to) or remote from the touch-screen device (e.g. computation may be performed on a remote computing device which may, for example, be located within a data center).

Although the module position sensor is described in many examples as being an accelerometer or magnetometer (e.g. a Hall effect sensor), it will be appreciated that in other examples it may be a gyroscope.

A first further example provides a removable input module for a touch-screen device, the input module comprising: an attachment mechanism arranged to attach the module to the touch-screen device; at least one input control; and a magnetometer, wherein the magnetometer is configured to provide signals used for determining an orientation of the input module relative to the touch-screen device or another input module.

A second further example provides a removable input module for a touch-screen device, the input module comprising: means for attaching the module to the touch-screen device; at least one input control; and a magnetometer, wherein the magnetometer is configured to provide signals used for determining an orientation of the input module relative to the touch-screen device or another input module.

A third further example comprises a computing device comprising a touch-sensitive display, an input to receive a signal from a removable input module, a processor and a memory arranged to store computer executable instructions which, when executed by the processor, modify operation of the computing device based on the signal received. The removable input module may comprise: an attachment mechanism arranged to attach the module to the touch-screen device; at least one input control; and a magnetometer, wherein the magnetometer is configured to provide signals used for determining an orientation of the input module relative to the touch-screen device or another input module.

In any of the examples described above (including the three further examples), the magnetometer may be a Hall effect sensor.

In any of the examples described above (including the three further examples), the output of the magnetometer may depend on a magnetic field generated by a speaker arrangement in the touch-screen device.

In any of the examples described above (including the three further examples), the magnetometer may be configured to provide signals used for determining an orientation of the input module and for determining a position of the input control.

In any of the examples described above (including the three further examples), the removable input module may further comprise: one or more sensors configured to provide outputs used for detecting an operational state of the input module; and a processor arranged to analyze outputs from the one or more sensors to detect the operational state of the input module. The one or more sensors may comprise the magnetometer. The processor may be arranged to select an operational state from a set comprising three or more candidate states. The three or more candidate states may be selected from:

i) Not attached to anything,
ii) Attached to a touch-screen device,
iii) Attached to an object which is not a touch-screen device,
iv) Attached to a dock,
v) Attached to a touch-screen device which is switched on,
vi) Attached to a touch-screen device which is switched off,
vii) One of a plurality of input modules attached to a touch-screen device
viii) Attached to a dock and charging, and
ix) Attached to a dock and not charging.

In any of the examples described above (including the three further examples), the removable input module may further comprise: a wire-free communication module and wherein the processor is further arranged to reduce a transmission power of the wire-free communication module in response to detecting that the input module is attached to a touch-screen device.

In any of the examples described above (including the three further examples), the removable input module may further comprise: a wire-free communication module and wherein the processor is further arranged to communicate with a first entity via the wire-free communication module in response to detecting that the input module is in a first operational state and to communicate with a second entity via the wire-free communication module in response to detecting that the input module in a second operational state. The first entity may comprise the touch-screen device, the second entity may comprise another input module or a charging dock and the second operational state indicates that the input module is connected to the charging dock.

In any of the examples described above (including the three further examples), the one or more sensors configured to provide outputs used for detecting an operational state of the input module may comprise a magnetometer and the processor is arranged to analyze an output signal of the magnetometer and to determine that the input module is connected to a charging dock if the output signal corresponds to a pre-defined magnetic field generated by the charging dock.

In any of the examples described above (including the three further examples), the one or more sensors configured to provide outputs used for detecting an operational state of the input module may comprise a magnetometer and the processor is arranged to analyze an output signal of the magnetometer and to determine that the input module is connected to the touch-screen device if the output signal corresponds at least in part to a magnetic field generated by a speaker arrangement in the touch-screen device.

In any of the examples described above (including the three further examples), the removable input module may further comprise: a module arranged to communicate a wireless identifier to the touch-screen device, wherein the wireless identifier is used by the touch-screen device to link the input module to the touch-screen device. The module may comprise one of an RFID tag or a LED arranged to communicate the wireless identifier by flashing.

A fourth further example provides a method comprising: receiving an output signal from a magnetometer in a removable input module for a touch-screen device; and determining an orientation of the input module relative to the touch-screen device or another input module based at least on the output signal.

The method may further comprise: determining an operational state of the input module based at least on the output signal from the magnetometer or an output signal from one or more other sensors in the input module.

In addition, or instead, the method may further comprise: reducing a transmission power of a wire-free communication element in response to detecting an operational state indicating that the input module is attached to the touch-screen device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. Propagated signals may be present in a tangible storage media (e.g. they may be stored in a tangible storage media or used in the storage process), but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A removable input module for a touch-screen device, the input module comprising:
   an attachment mechanism arranged to attach the input module to the touch-screen device;
   at least one input control; and
   an accelerometer and/or a magnetometer, wherein the accelerometer and/or magnetometer is configured to provide signals used for determining an orientation of the input module relative to the touch-screen device or another input module.

2. The removable input module according to claim 1 comprising the accelerometer configured to provide signals used for determining an orientation of the input module relative to the touch-screen device or another input module and wherein the orientation of the input module is determined by comparing an output of the accelerometer to an output of an accelerometer in the touch-screen device or another input module.

3. The removable input module according to claim 1 comprising the magnetometer configured to provide signals used for determining an orientation of the input module relative to the touch-screen device or another input module and wherein the orientation of the input module is determined by comparing an output of the magnetometer to a plurality of stored reference values for the output.

4. The removable input module according to claim 3, wherein the magnetometer is a Hall effect sensor.

5. The removable input module according to claim 3, wherein the output of the magnetometer depends on a magnetic field generated by a speaker arrangement in the touch-screen device.

6. The removable input module according to claim 3, wherein the magnetometer is configured to provide signals used for determining an orientation of the input module and for determining a position of the input control.

7. The removable input module according to claim 1, further comprising:
   one or more sensors configured to provide outputs used for detecting an operational state of the input module; and
   a processor arranged to analyze outputs from the one or more sensors to detect the operational state of the input module.

8. The removable input module according to claim 7, wherein the one or more sensors comprises the accelerometer and/or the magnetometer.

9. The removable input module according to claim 7, wherein the processor is arranged to select an operational state from a set comprising three or more candidate states.

10. The removable input module according to claim 9, wherein the set comprises three or more candidate states selected from:
   i) Not attached to anything,
   ii) Attached to a touch-screen device,
   iii) Attached to an object which is not a touch-screen device,
   iv) Attached to a dock,
   v) Attached to a touch-screen device which is switched on,
   vi) Attached to a touch-screen device which is switched off,
   vii) One of a plurality of input modules attached to a touch-screen device
   viii) Attached to a dock and charging, and
   ix) Attached to a dock and not charging.

11. The removable input module according to claim 7, further comprising:
   a wire-free communication module
   and wherein the processor is further arranged to:
      reduce a transmission power of the wire-free communication module in response to detecting that the input module is attached to a touch-screen device; and/or
      communicate with a first entity via the wire-free communication module in response to detecting that the input module is in a first operational state and to communicate with a second entity via the wire-free communication module in response to detecting that the input module in a second operational state.

12. The removable input module according to claim 11, wherein the first entity comprises the touch-screen device, the second entity comprises another input module or a charging dock and the second operational state indicates that the input module is connected to the charging dock.

13. The removable input module according to claim 7, wherein the one or more sensors configured to provide outputs used for detecting an operational state of the input module comprises a magnetometer and the processor is arranged to analyze an output signal of the magnetometer and to determine that the input module is connected to a charging dock if the output signal corresponds to a pre-defined magnetic field generated by the charging dock.

14. The removable input module according to claim 7, wherein the one or more sensors configured to provide outputs used for detecting an operational state of the input module comprises a magnetometer and the processor is arranged to analyze an output signal of the magnetometer and to determine that the input module is connected to the touch-screen device if the output signal corresponds at least in part to a magnetic field generated by a speaker arrangement in the touch-screen device.

15. The removable input module according to claim 1, further comprising:
   a module arranged to communicate a wireless identifier to the touch-screen device, wherein the wireless identifier is used by the touch-screen device to link the input module to the touch-screen device.

16. The removable input module according to claim 15, wherein the module comprises one of an RFID tag or a LED arranged to communicate the wireless identifier by flashing.

17. A method comprising:
   receiving an output signal from one of an accelerometer or a magnetometer in a removable input module for a touch-screen device; and
   determining an orientation of the input module relative to the touch-screen device or another input module based at least on the output signal.

18. The method according to claim 17, further comprising:
   determining an operational state of the input module based at least on the output signal from the accelerometer or magnetometer or an output signal from one or more other sensors in the input module.

19. The method according to claim 18, further comprising:
   reducing a transmission power of a wire-free communication element in response to detecting an operational state indicating that the input module is attached to the touch-screen device.

20. A removable input module for a touch-screen device, the input module comprising:
   an attachment mechanism arranged to attach the input module to the touch-screen device;
   at least one input control; and
   a module position sensor configured to provide signals used for determining an orientation of the input module relative to the touch-screen device or another input module.

* * * * *